US007649534B2

(12) United States Patent
Salmre

(10) Patent No.: US 7,649,534 B2
(45) Date of Patent: Jan. 19, 2010

(54) DESIGN OF ARBITRARY LINEAR AND NON-LINEAR MAPS

(75) Inventor: Ivo William Salmre, Aachen (DE)

(73) Assignee: Microsoft Corporation, Redmond, WA (US)

(*) Notice: Subject to any disclaimer, the term of this patent is extended or adjusted under 35 U.S.C. 154(b) by 391 days.

(21) Appl. No.: 11/344,827

(22) Filed: Feb. 1, 2006

(65) Prior Publication Data

US 2007/0176932 A1    Aug. 2, 2007

(51) Int. Cl.
G09G 5/00       (2006.01)
G06T 11/20      (2006.01)
G01C 21/00      (2006.01)

(52) U.S. Cl. .................. 345/441; 345/634; 345/646; 345/647; 701/200

(58) Field of Classification Search ................. 345/419, 345/647; 382/276, 248
See application file for complete search history.

(56) References Cited

U.S. PATENT DOCUMENTS

| 4,937,570 | A |   | 6/1990  | Matsukawa et al. |         |
|-----------|---|---|---------|------------------|---------|
| 5,631,642 | A |   | 5/1997  | Brockelsby et al. |        |
| 5,638,523 | A | * | 6/1997  | Mullet et al.    | 715/855 |
| 5,774,829 | A |   | 6/1998  | Cisneros et al.  |         |
| 5,841,443 | A |   | 11/1998 | Einkauf          | 345/430 |
| 5,925,091 | A | * | 7/1999  | Ando             | 701/212 |
| 6,121,972 | A |   | 9/2000  | Takahashi        | 345/419 |
| 6,141,013 | A |   | 10/2000 | Nelson           | 345/426 |
| 6,178,380 | B1| * | 1/2001  | Millington       | 701/212 |
| 6,196,516 | B1| * | 3/2001  | Lan              | 248/634 |
| 6,222,482 | B1| * | 4/2001  | Gueziec          | 342/357.08 |
| 6,233,523 | B1|   | 5/2001  | Sood             |         |
| 6,252,544 | B1|   | 6/2001  | Hoffberg         |         |
| 6,321,158 | B1|   | 11/2001 | DeLorme et al.   |         |
| 6,429,812 | B1|   | 8/2002  | Hoffberg         |         |
| 6,442,483 | B1|   | 8/2002  | Doglione         |         |
| 6,526,178 | B1| * | 2/2003  | Fukuhara         | 382/249 |
| 6,615,134 | B2|   | 9/2003  | Ando             |         |
| 6,697,734 | B1|   | 2/2004  | Suomela          | 701/212 |

(Continued)

FOREIGN PATENT DOCUMENTS

AU      2007231862  A1    5/2008

(Continued)

OTHER PUBLICATIONS

Translated JP2004085779.*

(Continued)

*Primary Examiner*—M Good Johnson
(74) *Attorney, Agent, or Firm*—Woodcock Washburn LLP

(57) ABSTRACT

Various software mapping aspects are provided. They include, but are not limited to, providing linear map to non-linear map conversion or transformation (and vice versa) in a symmetric fashion, so that data in one map upon conversion is symmetric in another map with respect to the former map. One way this is accomplished is by the use of dual-triangles that are mapped into the former and latter map, by having, in one exemplary aspect, the same vertices in both maps. Additional features, such as selection regions for regions to be converted or not converted are used. Furthermore, dual-triangle subdivision or aggregation techniques can be used to provide a desired mapping scenario. Finally, APIs are presented that allow developers and users of such mapping technology to implement the various aspects disclosed herein.

20 Claims, 19 Drawing Sheets

U.S. PATENT DOCUMENTS

| | | | |
|---|---|---|---|
| 6,710,774 B1 | 3/2004 | Kawasaki et al. | |
| 6,857,016 B1 | 2/2005 | Motoyama et al. | 709/224 |
| 6,879,909 B2 | 4/2005 | Hirano et al. | 701/208 |
| 6,956,590 B1 * | 10/2005 | Barton et al. | 345/684 |
| 7,038,681 B2 * | 5/2006 | Scott et al. | 345/440 |
| 7,126,616 B2 * | 10/2006 | Jasa et al. | 345/645 |
| 7,519,470 B2 | 4/2009 | Brasche et al. | |
| 2001/0038718 A1 * | 11/2001 | Kumar et al. | 382/284 |
| 2002/0049533 A1 | 4/2002 | Kusano | |
| 2002/0118118 A1 | 8/2002 | Myllymaki et al. | |
| 2003/0052896 A1 * | 3/2003 | Higgins et al. | 345/619 |
| 2003/0184654 A1 | 10/2003 | Kinjo | 348/207.1 |
| 2004/0008138 A1 | 1/2004 | Hockley, Jr. et al. | 342/357.09 |
| 2004/0073356 A1 | 4/2004 | Craine | |
| 2004/0073361 A1 | 4/2004 | Tzamaloukas et al. | 701/210 |
| 2004/0153238 A1 | 8/2004 | Miyahara | |
| 2004/0204063 A1 | 10/2004 | Van Erlach | 455/556.1 |
| 2004/0220726 A1 | 11/2004 | Jin et al. | |
| 2004/0243307 A1 | 12/2004 | Geelen | |
| 2004/0255718 A1 | 12/2004 | Steers | 74/572 |
| 2005/0117215 A1 * | 6/2005 | Lange | 359/462 |
| 2005/0131660 A1 * | 6/2005 | Yadegar et al. | 703/2 |
| 2005/0149251 A1 | 7/2005 | Donath et al. | |
| 2006/0064243 A1 | 3/2006 | Hirose | |
| 2006/0132482 A1 * | 6/2006 | Oh | 345/419 |
| 2007/0014488 A1 * | 1/2007 | Chen et al. | 382/294 |
| 2007/0027628 A1 | 2/2007 | Geelen | |
| 2007/0050129 A1 | 3/2007 | Salmre | |
| 2007/0185651 A1 | 8/2007 | Motoyama et al. | |
| 2007/0203641 A1 | 8/2007 | Diaz et al. | |
| 2007/0203643 A1 | 8/2007 | Ramaswamy et al. | |
| 2007/0203646 A1 | 8/2007 | Diaz et al. | |
| 2007/0233367 A1 | 10/2007 | Chen et al. | |

FOREIGN PATENT DOCUMENTS

| | | |
|---|---|---|
| CN | 201000710 | 1/2008 |
| DE | 3512000 | 10/1986 |
| EP | 1 235 142 A2 | 8/2002 |
| EP | 1318379 A1 | 6/2003 |
| EP | 1435600 B1 | 7/2004 |
| FR | 2343300 | 11/1977 |
| GB | 2 374 763 A | 10/2002 |
| JP | 63222215 | 9/1988 |
| JP | 04366991 | 12/1992 |
| JP | 06118870 | 4/1994 |
| JP | 08211830 | 8/1996 |
| JP | 2004/085779 | 3/2004 |
| JP | 2004/118685 | 4/2004 |
| JP | 2004310717 | 11/2004 |
| WO | WO 0049530 | 8/2000 |
| WO | WO 01/32480 A1 | 5/2001 |
| WO | WO 2007027374 A2 | 3/2007 |

OTHER PUBLICATIONS

Bahl, P., et al., "A software system for locating mobile users: design, evaluation, and lessons," *Microsoft Research*, downloaded Oct. 4, 2005, http://research.microsoft.com/~bahl/Papers/Pdf/radar.pdf, 1-13.

Hermann, F., et al., "Egocentric maps on mobile devices," *Fraunhofer Institute for Industrial Engineering, Germany*, 2003, downloaded Oct. 4, 2005, http://www.hci.iao.fraunhofer.de/uploads/tx_publications/HermannBieberDuesterhoeft2003_Egocentric_Maps_IMC_03_Rost_.pdf, 7 pages.

Microsoft speech application SDK, downloaded Oct. 4, 2005, http://msdn.microsoft.com/library, 2 pages.

Schell, G. et al., "Construction and Maintenance of Augmented Reality Environments Using a Mixture of Autonomous and Manuel Surveying Techniques", Proc. 7$^{th}$ Conf. Optical 3-D Measurement Techniques, 2005, 1, 9 pages.

Ledermann, F. et al., "April-a-High Level Framework for Creating Auugmented Reality Presentations", Proc. IEEE VR, IEEE CS Press, 2005, 187-194.

Reitmayr, G. et al, "Data Management Strategies for Mobile Augmented Reality", Proc. Int'l Workshop, Software Technology for Augmented Reality Systems, IEEE CS Press, 2003, 47-52.

Reitmayr, G. et al., "OpenTracker-A-Flexible Software Design for Three-Dimensional Interaction", Virtual Reality, 2005, 9(1), 79-92.

Reitmayr, G. et al., "Location Based Applications for Mobile Augmented Reality", Proc. Australasian User Interface Conf(AUIC), IEEE CS Press, 2003, 65-73.

Schell, G. et al., "Handheld Geospatial Augmented Reality using Urban 3D Models", Proc. Mobile Spatial Interaction Workshop, Computer-Human Interaction Conf. Springer, 2007, 4 pages.

Lindeman, R.W. et al., "Hand-Held Windows: Towards Effective 2D Interaction in Immersive Virtual Environments", IEEE, Virtual Reality, 1999, 205-212.

Lindeman, R.W. et al., "Effect of 3D Widget Representation and Simulated Surface Constraints on Interaction in Virtual Environments", IEEE, Virtual Reality, Mar. 2001, 141-148.

Brown, W.M. et al., "Sighted Automation and Fine Resolution Imaging" Aerospace and Electronic Systems, IEEE Transacations, Oct. 2004, 1426-1445.

Han Li et al., "Avoiding Static and Dynamic Objects in Navigation", Intelligent Robots and Systems, 2006, 639-644.

Tistarelli, M. et al., "Dynamic Stereo in Visual Navigation", Computer Vision and Pattern Recognition, 1991, Proceedings CVPR 1991, IEEE Computer Society, 186-193.

Baciu, G. et al., "Rendering in Object Interference Detection on Conventional Graphics Workstations", Computer Graphics and Applications, 1997, Proceedings of the Fifth (5$^{th}$) Pacific Conference, Oct. 1997, 51-58.

Millonig, A. et al., "Developing Landmark-Based Pedestrian Navigation Systems", IEEE, 2005, Sep. 13-15, 197-202.

Innocenti, M. et al., "Low Cost and Low Weight Technologies for Planetary Surface Exploration", RAST Jun. 2007, 3$^{rd}$ International Conference , 562-567.

\* cited by examiner

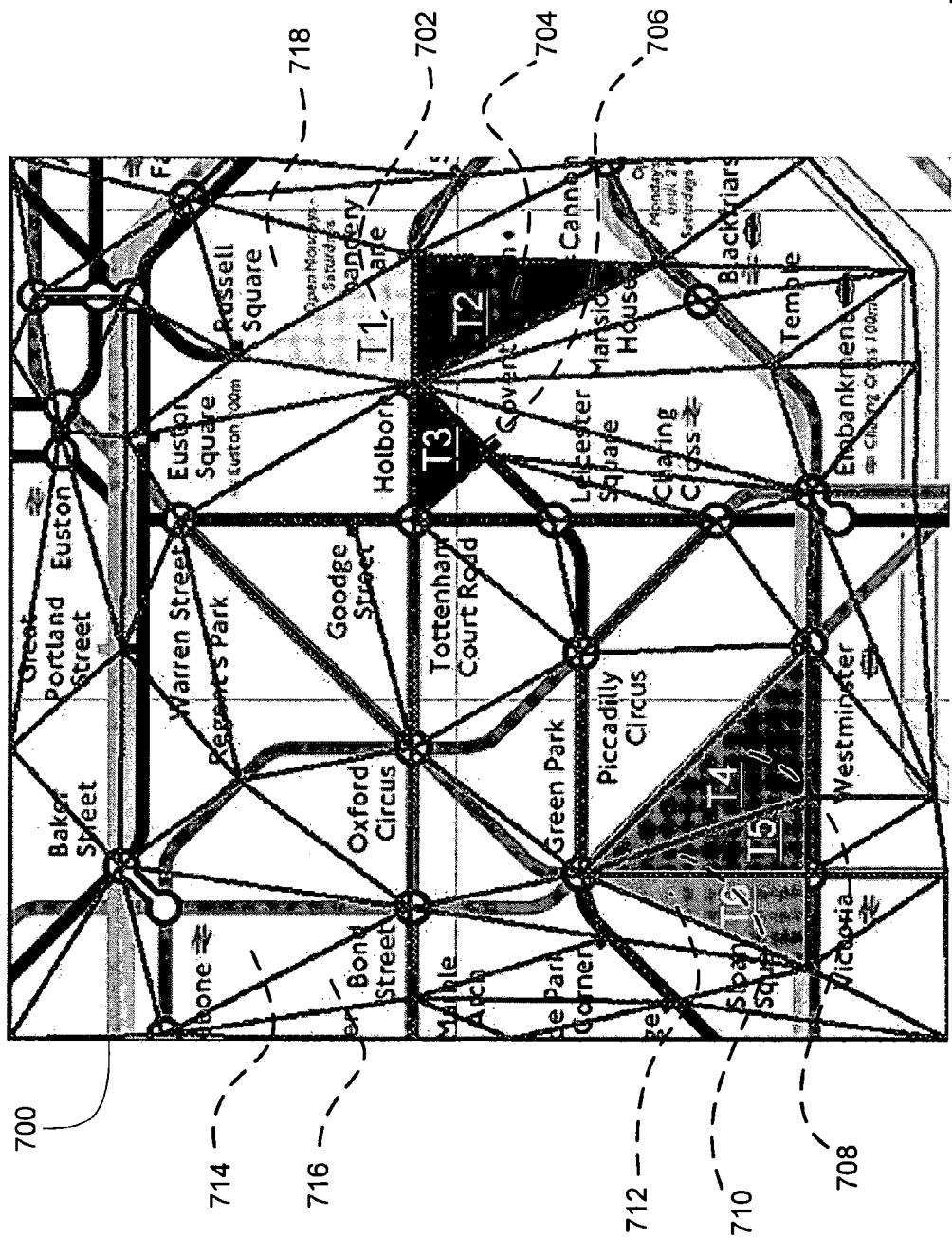

DESIGN OF ARBITRARY LINEAR AND NON-LINEAR MAPS

CROSS-REFERENCE TO RELATED SUBJECT MATTER

The present application is related to application Ser. No. 11/217,638, filed Aug. 31, 2005, entitled "LOCATION SIGNPOSTING AND ORIENTATION," and to application Ser. No. 10/998,081, filed Nov. 26, 2004, entitled "LOCATION AWARE MOBILE-DEVICE SOFTWARE DEVELOPMENT."

FIELD OF TECHNOLOGY

The present subject matter relates to the field of computing, and more particularly, to software mapping.

BACKGROUND

Maps that do not have a linear mapping to real world space (latitude, longitude, and altitude, or other measurements in the physical world) are very common and useful, but can be difficult to use with generic software systems. Examples of such non-linear maps include: subway maps, ski-maps, industrial diagrams and infrastructure diagrams (e.g. maps of power grids, telecommunications grids and wide area transportation maps).

On such irregularly spaced non-linear maps, spaces get compressed, stretched, rotated, and otherwise distorted. The nature of these distortions also often varies within the map itself, with different regions of the map being distorted in different ways. For instance, one region may be stretched, another may be compressed, and still another region may be rotated—or a combination thereof—and so on.

Because these non-linear maps present an irregular representation of physical space, they are able to convey a great deal of useful information in a small display. However it is difficult to display real world location data on top of non-linear maps because the mapping from latitude, longitude, and altitude (or other physical world coordinate systems) to a position on such irregularly spaced maps is complex and irregular. At least two key difficulties arise: (1) the ability to map real-world locations onto the irregularly spaced maps, (2) the ability to map points on the irregularly spaced maps into physical world coordinates.

Certain techniques can be used for extrapolating the location of map-points on top of non-linear, irregularly spaced maps. Typically these techniques work by attempting to extrapolate location data from nearby points, but this can be complex, time consuming, and error-prone—particularly in systems where the map's data is irregularly spaced. Thus, it would be advantageous to provide other techniques that allow users to make the design-time and run-timeuse of non-linear mapping techniques that are fast, simple, and accessible to moderately skilled programmers and other individuals who are not experts in map-design, complex math or cartography.

SUMMARY

Techniques are provided that allow for the designing and using of arbitrary maps, whether these maps may be linear or non-linear. By way of example and not limitation, a first map image and a second map image may be provided. In addition, a plurality of dual-triangles may be mapped onto the first map image and the second map image, where the plurality of dual-triangles have the same vertices in the second map image as in the first map image—yet these maps may be completely different. For instance, the first map image may be a linear street map and the second map image may be a non-linear subway map. Because any points that are converted from the first map image to the second map image (or vice versa) are converted symmetrically, such points will end up in the appropriate relation to the vertices of the dual-triangles.

In another aspect, at least one of the plurality of dual-triangles can be selected into a region to be converted from the first map image to the second map image. Such regions may help users and developers to hone in on best information-conveying maps (or portions thereof). Alternatively, such regions may also be used to exclude maps or portions thereof so that such regions are not be converted. In yet another aspect, the plurality of dual-triangles may also be subdivided into more sub-triangles or aggregated into more comprehensive triangles. Various other aspects are disclosed herein.

Thus, it should be noted, that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included:

FIG. 7A illustrates a full set of triangles that have been mapped onto a non-linear map, with the six triangles discussed with reference to FIGS. 5 and 6 depicted along side this full set of triangles, where the full set of triangles forms a mapping of a non-linear space to a linear space;

DETAILED DESCRIPTION

Aspects of Linear and Non-Linear Mapping

Figure 1:
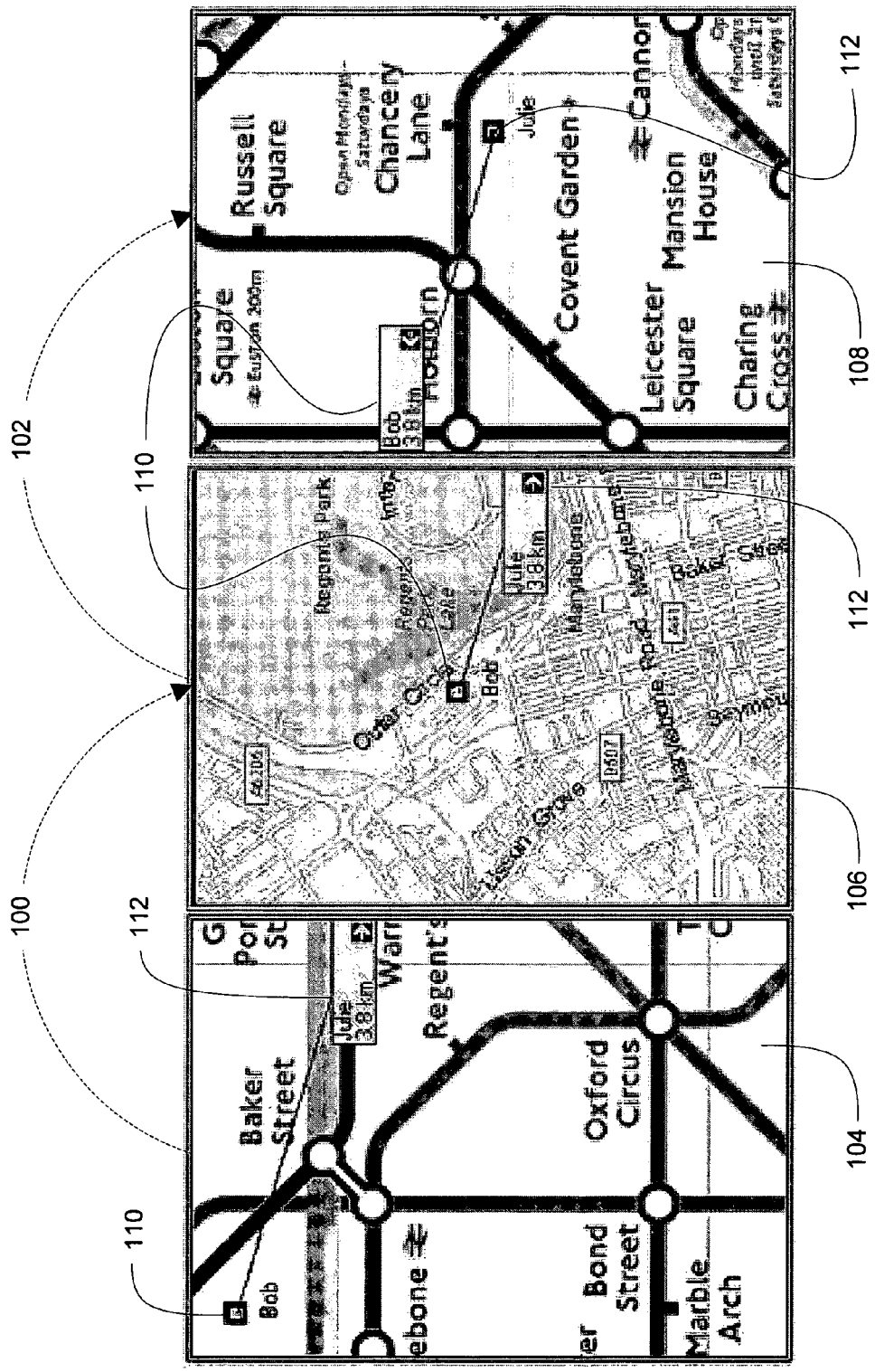
FIG. 1 illustrates the ability of the presently disclosed subject matter to switch back and forth between linear and non-linear maps.

In one aspect of the presently disclosed subject matter, FIG. 1 illustrates the ability of switching back and forth between linear and non-linear maps. FIG. 1 depicts the desirability of users to switch between linear maps (e.g. street maps) and non-linear maps (e.g. subway or transport maps). By shifting between different maps, users can quickly determine the distance, direction, and mode of transport to arrive at a desired location, or to meet other individuals, or for still other purposes.

For example, a non-linear subway map 104 may depict two people as points on the map 104, the first point being "Bob" 110 and the second point being "Julie" 112, where "Julie" 112 has a signpost pointing to her. "Bob" 110 and "Julie" 112 may want to meet at some point, and the way to accomplish this may be by taking a subway or a "tube". If "Bob" 110 wants to meet "Julie" 112 he can take the appropriate train by examining the non-linear subway map 104. Once he's above ground, he may want to switch to a linear map 106.

In general terms, a user of such a non-linear map 104 may want to switch 100 to a linear map 106 depicting physical landmarks in linear proportionality to each other because such linear representation may be more intuitive in certain contexts. Thus, in the linear map 106, "Bob" 110 and "Julie" 112 are again depicted, but this time their location is shown on a linear scale, as opposed to a non-linear scale in the previous map 104.

Users, such as "Bob" 110, may want to switch back to a non-linear map after a while—even if the non-linear map has changed over time. Thus, in FIG. 1, "Bob" 110 can switch 102 from the linear map 106 discussed above to a new non-linear map 108. In this non-linear map 108, "Julie" 112 is depicted as a point and Bob 110 is depicted as a signpost. Now the relationship between "Bob" 110 and "Julie" 112 may be non-linear vis-à-vis any physical landmarks (where it might have been linear in the previous map 106).

This type of switching back and forth between linear and non-linear maps can be done indefinitely. And importantly, such switching may be done without any distortions as to the actual location of "Bob" 110 and "Julie" 112 on the linear and non-linear maps. As will be shown in more detail below, the present aspect of the disclosed subject matter overcomes distortions of points placed on maps that result from the eventual aggregation of errors associated with each switch between a linear and non-linear map—and vice versa.

Figure 2:
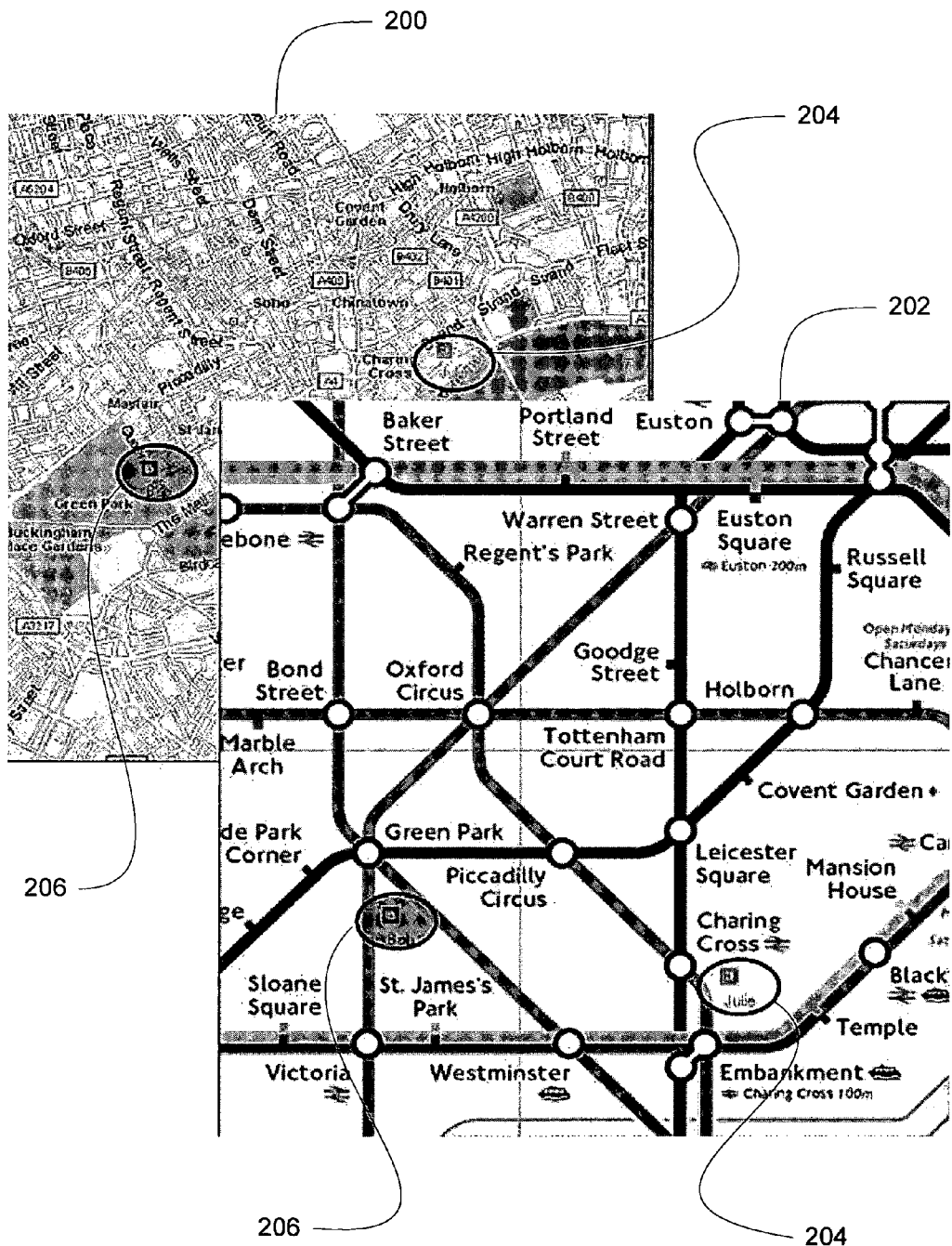
FIG. 2 illustrates that the spatial relationship between points mapped onto linear map may differ from the spatial relationship between points mapped onto a non-linear map.

In another aspect disclosed herein, FIG. 2 illustrates that the spatial relationship between points mapped onto linear map may differ from the spatial relationship between points mapped onto a non-linear map. Specifically, in FIG. 2, on the linear "street map" 200, Bob 206 (left side) appears below Julie 204 (right side), yet on the non-linear/irregular subway map 202, Bob 206 appears above Julie 204. Such kinds of shifts in relative display position are common as one moves between linear and non-linear maps. One reason, as mentioned above already, is that the non-linear map may have various regions of its map stretched, rotated, compressed, and so on.

Thus, eventhough Bob 206 and Julie 204 may be at the exact same locations in the linear map 200 as the non-linear map 202, their positions relative to each other and relative to the maps may differ. For instance, in FIG. 2, Julie 204 is located near "Charing Cross" both in the linear map 200 and the non-linear map. Bob 206, likewise, is located near "Green Park" on both maps 200 and 202. Yet, their positions vis-à-vis each other, as mentioned above, change between the two maps 200 and 202. Moreover, even if their positions don't change vis-à-vis each other, they can change in going from one map to the other (due to map distortion, especially in the non-linear case).

Figure 3:
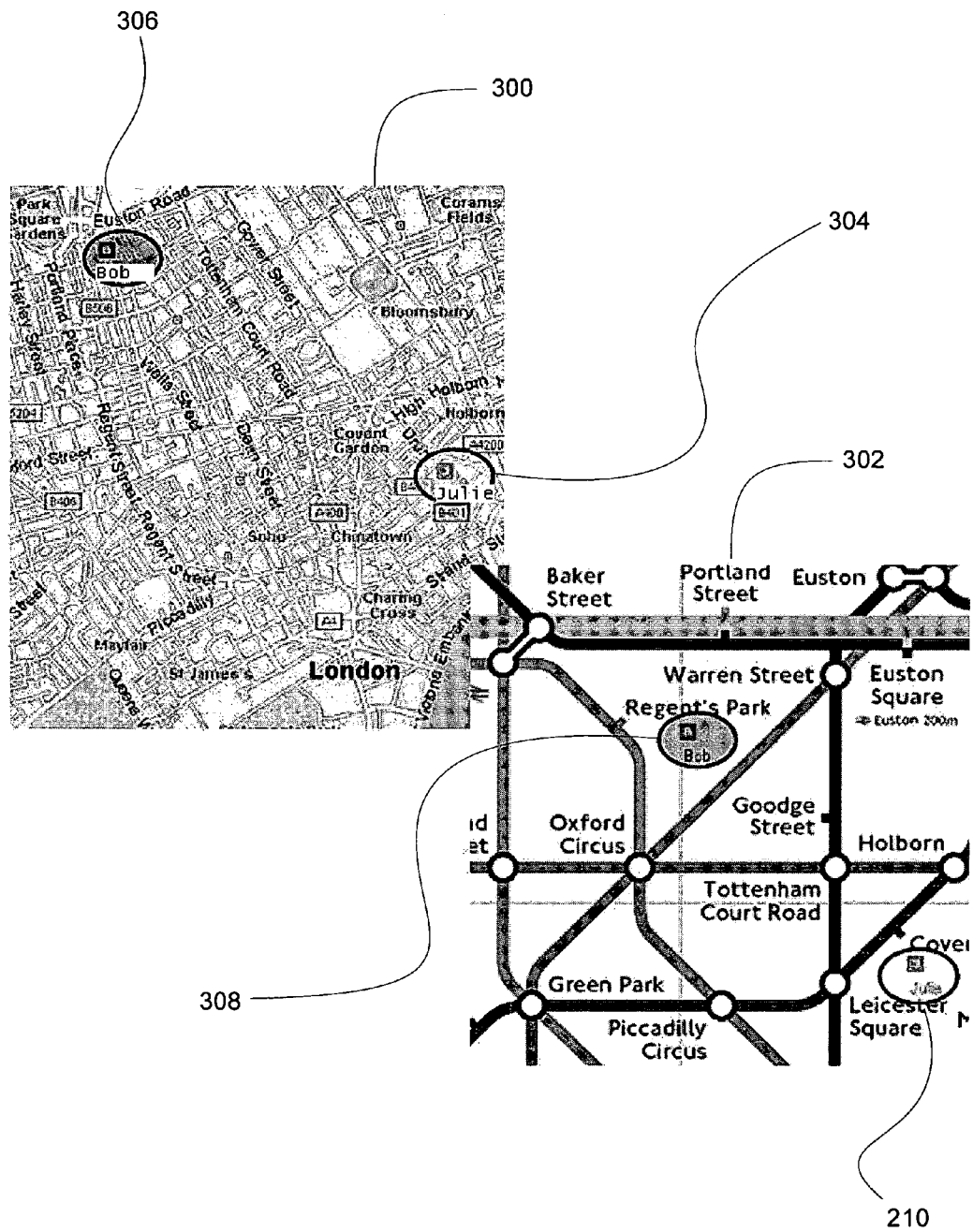
FIG. 3 illustrates that the spatial relationship between points mapped onto a linear map may at times be the same or similar as the spatial relationship between points mapped onto a non-linear map.

Of course, as FIG. 3 illustrates, the spatial relationship between points mapped onto a linear map may at times be the same or similar as the spatial relationship between points mapped onto a non-linear map. For example, in FIG. 3, Bob 306 has practically the same orientation vis-à-vis Julie 304 in the linear map 300 as the non-linear map 302. Moreover, the distance between Bob 306 and Julie 304 is practically the same in both maps 300 and 302. Thus, it appears that the conversion from the linear map 300 to the non-linear map 302 (or vice versa) caused practically no distortion. However, practically speaking, this may be more of an exception than the rule, and in a substantial number of such conversions, orientations, distances, etc., between mapped points on different maps will differ—and hence the ability of the presently disclosed subject matter to cope with such situations.

Figure 4:
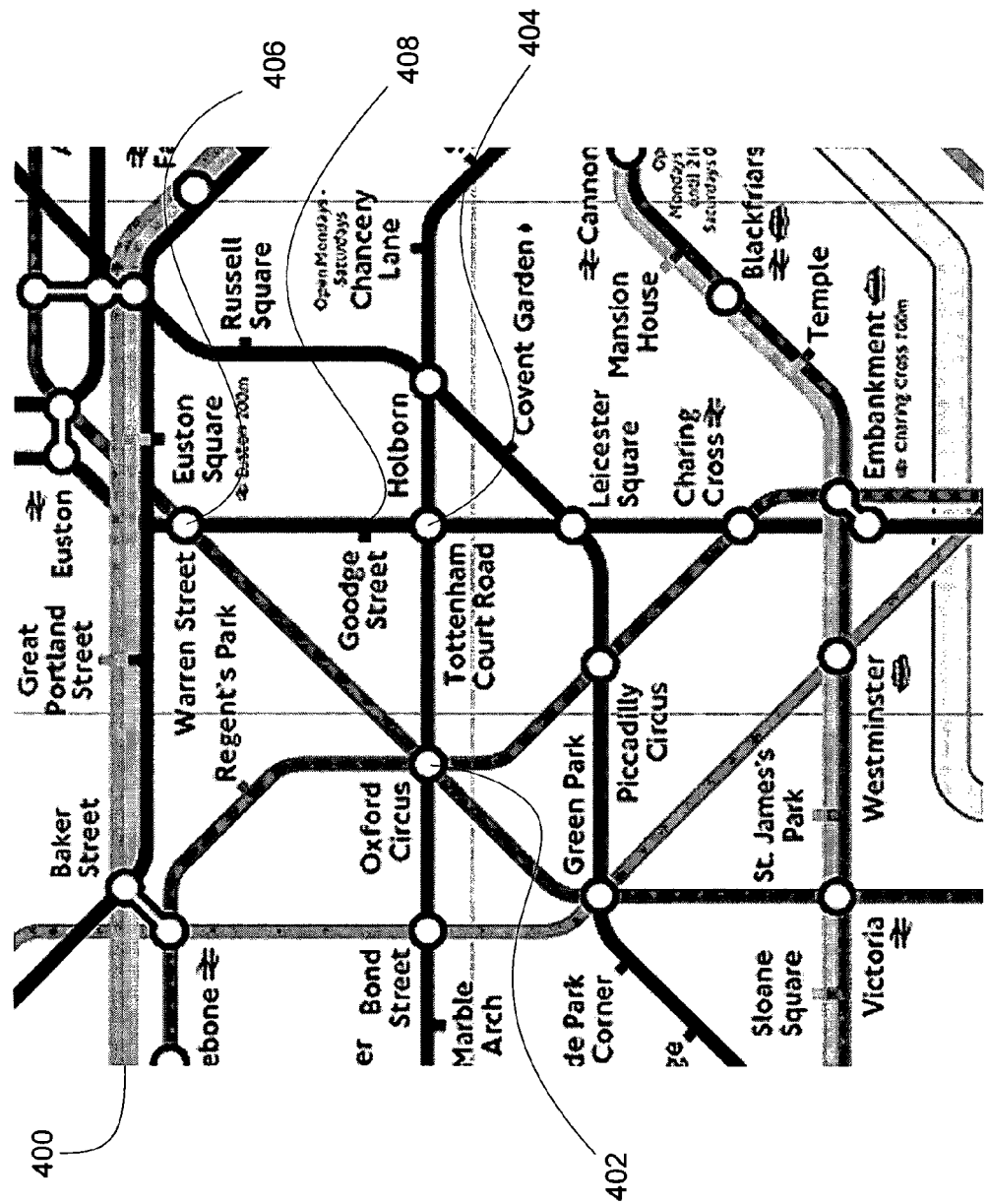
FIG. 4 illustrates a portion of a representative non-linear map, where different parts of the non-linear map may have different transformations applied to them, making the non-liner map's representation significantly different from the "street map" of the same area.

FIG. 4 illustrates a portion of a representative non-linear map, where different parts of the non-linear map may have different transformations applied to them, making the non-liner map's representation significantly different from the "street map" of the same area. (FIG. 4 also servers as a basis for the discussion concerning a majority of the figures to follow, especially FIGS. 5-8, and 11-16).

This particular non-linear map 400 shows the London Underground "Tube" map. To illustrate the non-linear nature of this map 400, it is instructive to focus on a couple of stations illustrated therein. For example, "Oxford Circus" 402 is shown, as is "Tottenham Court Road" 404, "Weston Street" 406, and "Goodge Street" 408—the first three of these four stations define a triangle between them. From FIG. 4, it appears as if "Goodge Street" 408 is a lot closer to "Tottenham Court Road" 404 than it is to "Warren Street" 406. However, in a linear setting, such as a typical street map, "Goodge Street" 408 is about half-way between "Tottenham Court Road" 404 and "Warren Street" 406. And this is merely a trivial and simple example, since other kinds of distortions could be involved between linear and non-linear maps (or between linear maps and other kinds of linear maps, or between non-linear maps and other kinds of non-linear maps)—as has been discussed already, above. Furthermore, those of skill in the art will readily appreciate the different kinds of distortions that can occur when mapping points or data from one map onto another map.

Figure 5:
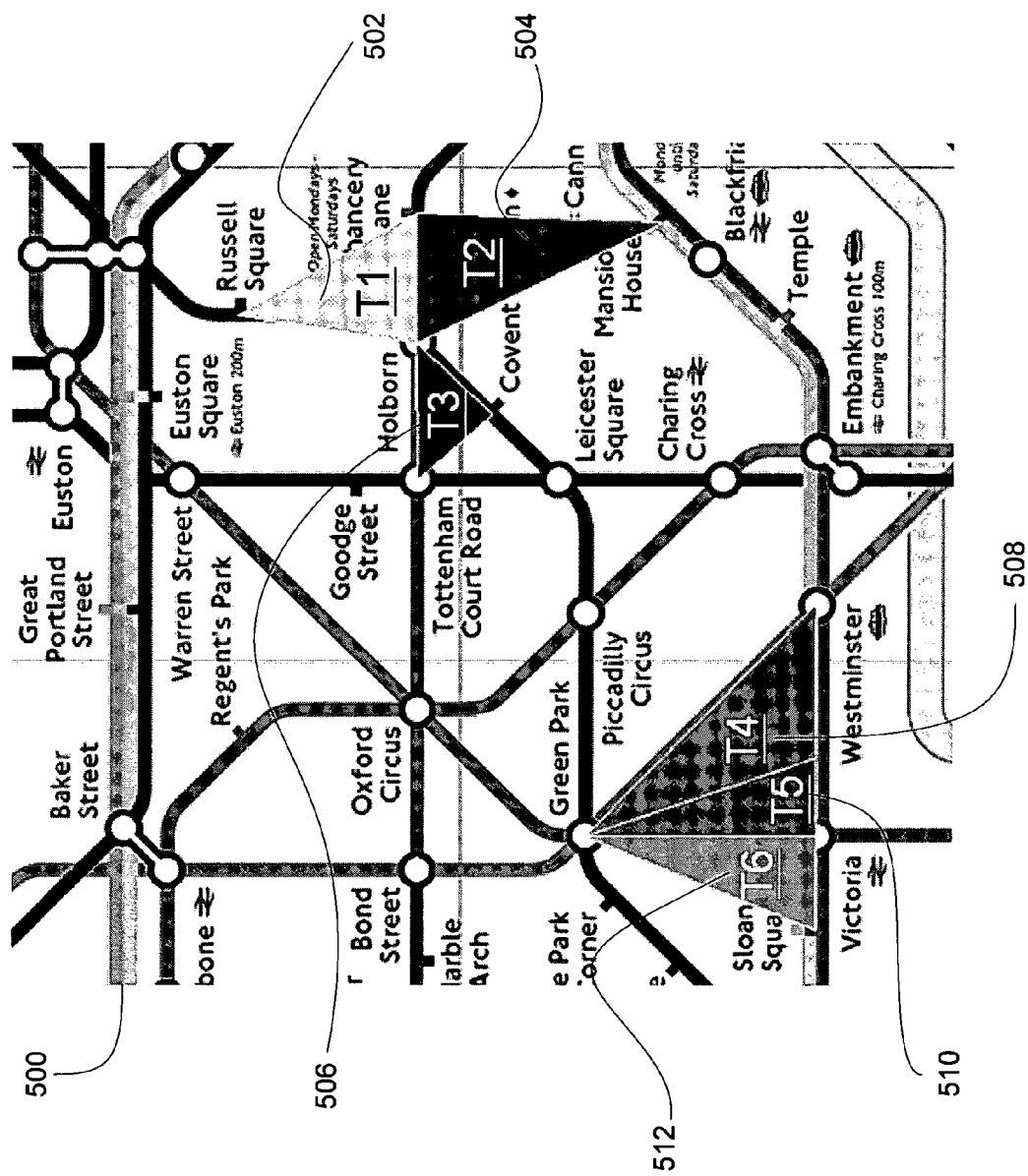
FIG. 5 illustrates how a non-linear map can be annotated by mapping software to highlight regions to be transformed into a linear mapping, with the regions being defined by six exemplary triangles.

FIG. 5 illustrates how a non-linear map can be annotated by mapping software to highlight regions to be transformed into a linear mapping, with the regions being defined by six exemplary triangles. The triangles depicted in FIG. 5, T1, T2, T3, T4, T5, and T6, corresponding to figure numbers 502, 504, 506, 508, 510, and 512, respectively, show that one way to convert a non-linear map 500 to a linear map (shown in FIG. 6) is to first define one or more triangles (or a set of triangles) that have their vertices at known locations on the map 500.

For instance, T1 502 has its vertices between "Russell Square," "Holborn," and "Chancery Lane." T2 504 has its vertices between "Holborn," "Chancery Lane," and "Mansion House," and so on. Also, it should be noted, that even though T1 502 and T2 504 happen to be contiguous, they don't have to be—as can be seen in FIG. 5, T3 506 is sharing a vertex with T1 502 and T2 504, namely, "Holborn," but it is not contiguous—as neither are T4 508, T5 510, and T6 512. These six exemplary triangles define the regions that are to be converted from a non-linear map to a linear map (shown in FIG. 6). Their particular shapes will be contorted by the transformation, and hence, so will the data in those triangles.

Figure 6:
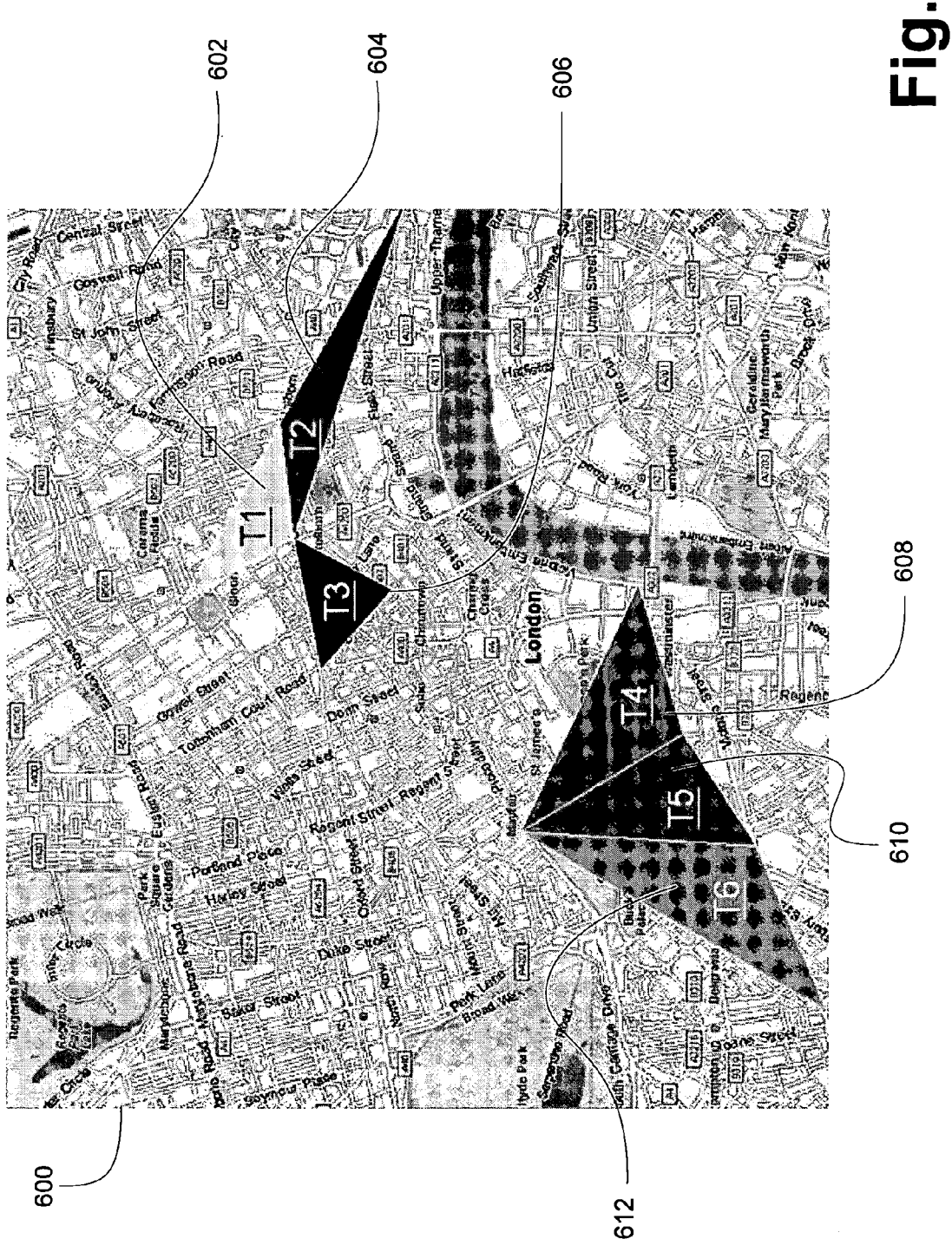
FIG. 6 illustrates how the same six triangles depicted in FIG. 5 would map onto a linear map, and how the shape of these triangles can differ from the shape of the same triangles that were mapped onto a non-linear map, thus suggesting how map space gets distorted in a non-linear context.

Now, turning to FIG. 6, it illustrates how the same six triangles depicted in FIG. 5 would map onto a linear map, and how the shape of these triangles can differ from the shape of the same triangles that were mapped onto a non-linear map, thus suggesting how map space gets distorted in a non-linear context. This distortion is clear in terms of the shapes of triangles T1 602, T2 604, T3 606, T4 608, T5 610, and T6 612, shown in FIG. 6, as compared to the same triangles T1 502, T2 504, T3 506, T4 508, T5 510, and T6 512, shown in FIG. 5. Since these six triangles get distorted, so do the corresponding points and data within them. One of the many advantages of the presently disclosed subject matter is that it can appropriately map such points and data from one set of triangles in a non-linear map space to another corresponding set of triangles in a linear map space (and vice versa).

In a manner of speaking, these six triangles have a "dual" nature in that they can be mapped into a linear space and a non-linear space, even though their relative shape may differ in each space context. However, in one aspect of the presently disclosed subject matter, what remains the same in both contexts is the vertices of the triangles. Thus, as already mentioned, triangle T1 602 in FIG. 6 may have the same three vertices as triangle T1 502 in FIG. 5—and the same may hold true for all the other remaining triangles in FIGS. 5 and 6.

Next, FIG. 7A illustrates a full set of triangles that have been mapped onto a non-linear map (where this map is shown without the triangles in FIG. 4). The six triangles discussed with reference to FIGS. 5 and 6 are depicted along side this full set of triangles, where the full set of triangles forms a mapping of non-linear space to linear space. For instance, a typical non-linear map 700 is divided into some set of triangles, as exemplified by triangles 714, 716, and 718 (referenced in "dashed" lines for readability purposes) and the now-familiar triangles T1 702, T2 704, T3 706, T4 708, T5 710, and T6 712, discussed with reference to FIGS. 5 and 6.

The set of mapping triangles, exemplified by triangles 702 and 714, may have their vertices set at known locations, such as a "Tube" stations of the London Underground. The level of granularity of the vertices will be context and design dependent. For instance, triangles may be set every other tube stop or several vertices between any two tube stops may be used. Thus, the size and number of the triangles depicted in FIG. 7A is merely exemplary and not limiting. Other kinds of triangles could be used, as those of skill in the art will readily appreciate.

Figure 7B:
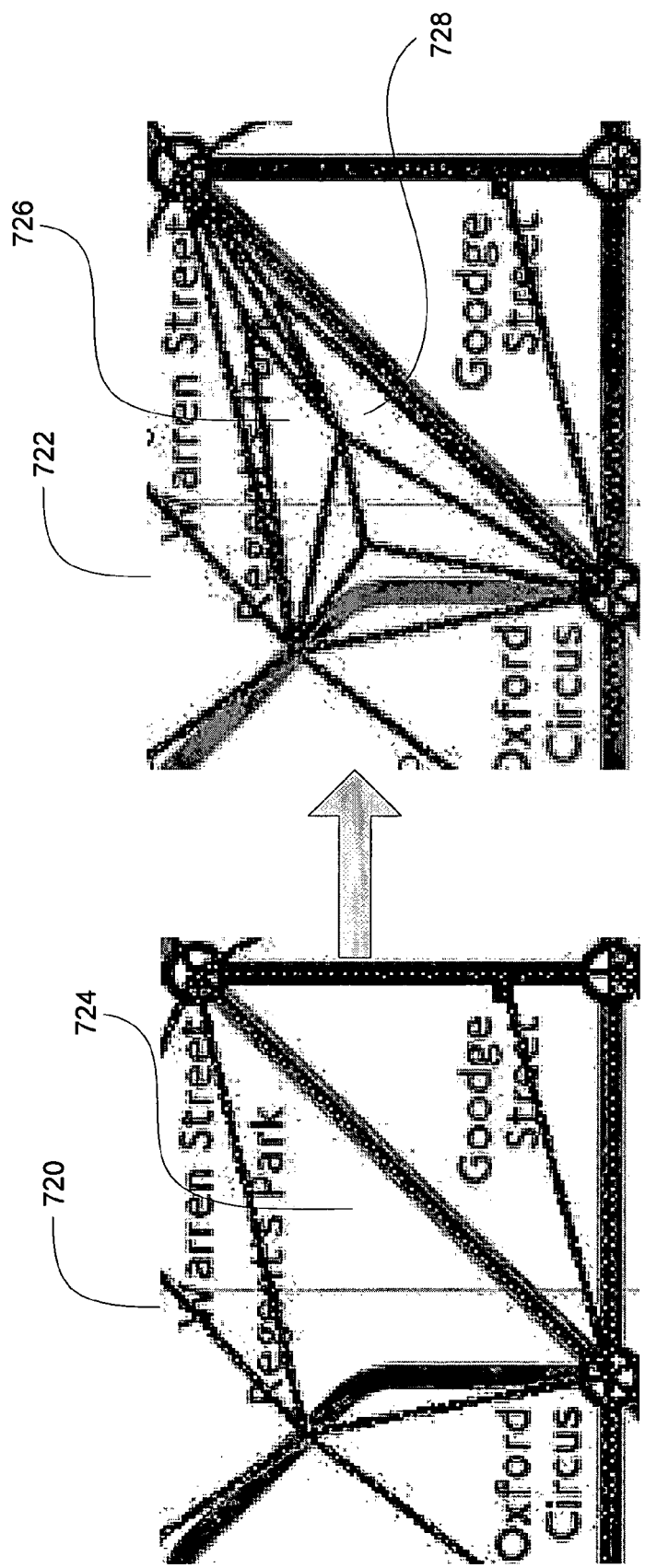
FIG. 7B illustrates how triangular regions configured for conversion may be subdivided at various levels of granularity to provide more accurate results.

For example, FIG. 7B illustrates how triangular regions configured for conversion may be subdivided at various levels of granularity to provide more accurate results. In the non-linear map on the left 720, one triangle 724 is defined between "Oxford Circus," "Regent's Park," and "Warren Street." In the non-linear map on the right 722, this triangle 724 is twice subdivided: once into three triangles and then again into nine triangles. Triangles 726 and 728 are representative of the nine triangles which are contained within the original triangle 724. As mentioned, subdivision is only one option—the opposite can occur—that is, triangles may also be combined to define larger triangles.

The triangular mapping considered so far, in one aspect, can be one from a Cartesian X/Y plane of the non-linear map onto any real-world coordinates such as latitude and longitude (including altitude, if a third coordinate Z is included in the Cartesian space). For instance, if the conversion is from a linear map to a non-linear one, Global Positioning System (GPS) coordinates can be used to construct a non-linear map (either a two dimensional flat map, a three dimensional spatial map, a four dimensional spatial map with a temporal component dimension, and so on).

Figure 8:
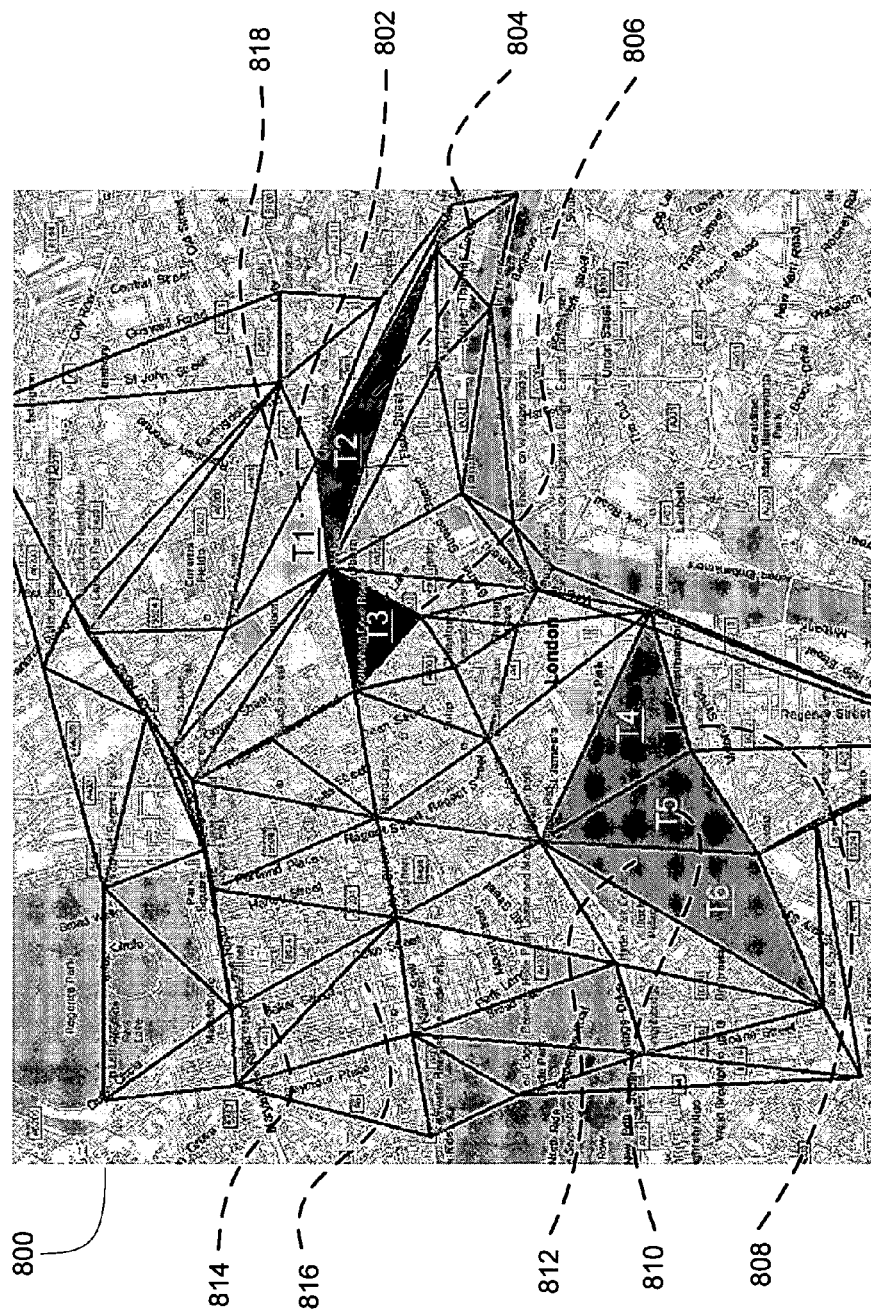
FIG. 8 illustrates the same mapping shown in FIG. 7, but this time in the context of a linear map, thereby demonstrating how the full set of triangles and the accompanying six highlighted triangles change in a linear setting (vis-à-vis a non-linear setting)

FIG. 8 illustrates the same mapping shown in FIG. 7, but this time in the context of a linear map, thereby demonstrating how the full set of triangles and the accompanying six highlighted triangles change in a linear setting (vis-à-vis the non-linear setting of FIG. 7). As expected, the six highlighted triangles T1 802, T2 804, T3 806, T4 808, T5 810, and T6 812, alongside some of the non-highlighted triangles 814, 816, and 818, have been distorted during the conversion to the linear map 800. However, the vertices of the triangles in FIG. 7 and FIG. 8 may remain the same.

Of course, various conversion techniques could be implemented here, where, for example, a set of linear-based triangles containing N triangles is converted to a non-linear setting, but where only half as many (N/2) triangles were mapped on the non-linear map. Or, vice versa, where twice as many triangles are mapped on the non-linear map, by using various interpolation techniques. The number of triangles used in FIG. 7 happens to be the same as the number of triangles used in FIG. 8, but this does not have to be the case. Using the same vertices in both linear and non-linear setting naturally leads to the same number of triangles, but this is merely one exemplary and non-limiting aspect.

Figure 9:
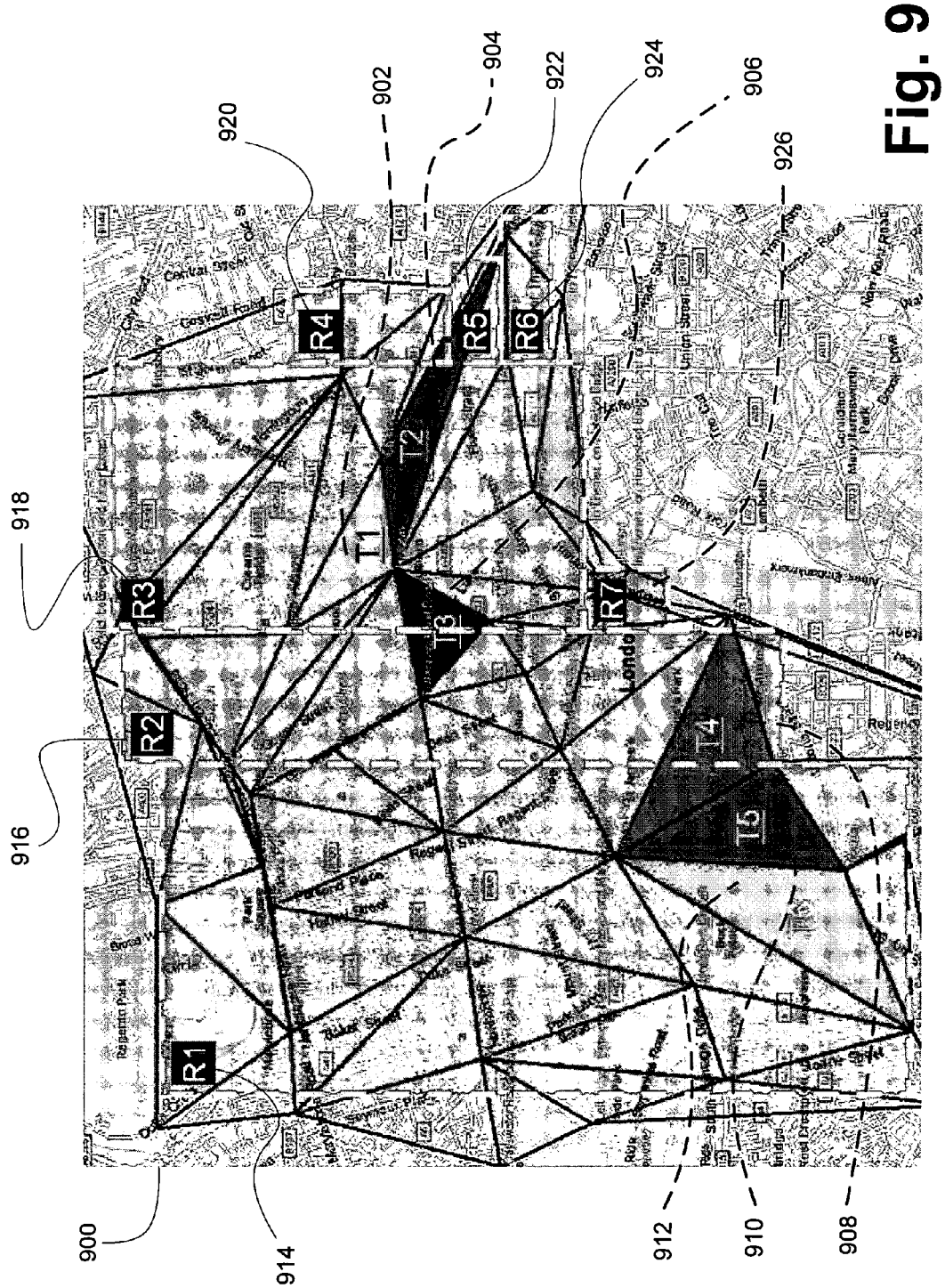
FIG. 9 illustrates how a set of regions can be used to specify the boundaries of a mapping from a linear map to a non-linear map, and by analogy, vice versa.

In another interesting aspect of the presently disclosed subject matter, FIG. 9 illustrates how a set of regions can be used to specify the boundaries of a mapping from a linear map to a non-linear map, and by analogy, vice versa. Specifically, FIG. 9 shows a set of coarse bounding regions that a user, developer or map-designer can specify that the non-liner or irregular subway/tube map of FIG. 4 should be applicable for. By being able to represent these regions on a normal linear street map, the developer or map-designer is given a good visual understanding of the geographic area covered by the non-linear map. Notably, these coarse bounding regions need not cover all the areas defined by triangles; the map's designer can choose only the areas best covered by the non-linear map.

Thus, in FIG. 9, on the linear map 900, a developer may select several regions, R1 914, R2 916, R3 918, R4 920, R5 922, R6 924, and R7 927. These regions may together cover the relevant portion of the subway that the developer (or user) may want to focus on. As the regions are illustrated in FIG. 9, they cover the highlighted triangles discussed in the previous figures: T1 902, T2 904, T3 906, T4 908, T5 910, and T6 912. These regions also cover other triangles that may represent areas of interest for the developer or the user of this subject matter. There is really no limit on the number of regions that may be used or the size of those regions. Moreover, although the regions as shown are contiguous, the don't have to be. The user or developer of this technology may simply select an area of interest to be converted into another map. Notably, in FIG. 9, a linear map is shown with selected regions, because this kind of setup allows a person to have a more intuitive feel for what information is important. However, if users or developers are more familiar with a non-linear setup, alternative, similar regions can be selected on a non-linear map to be then converted into a linear map. For instance, one might imagine subway workers and employees using a subway map with selected relevant regions to then see how such a subway map corresponds to a real world linear street map.

Figure 10:
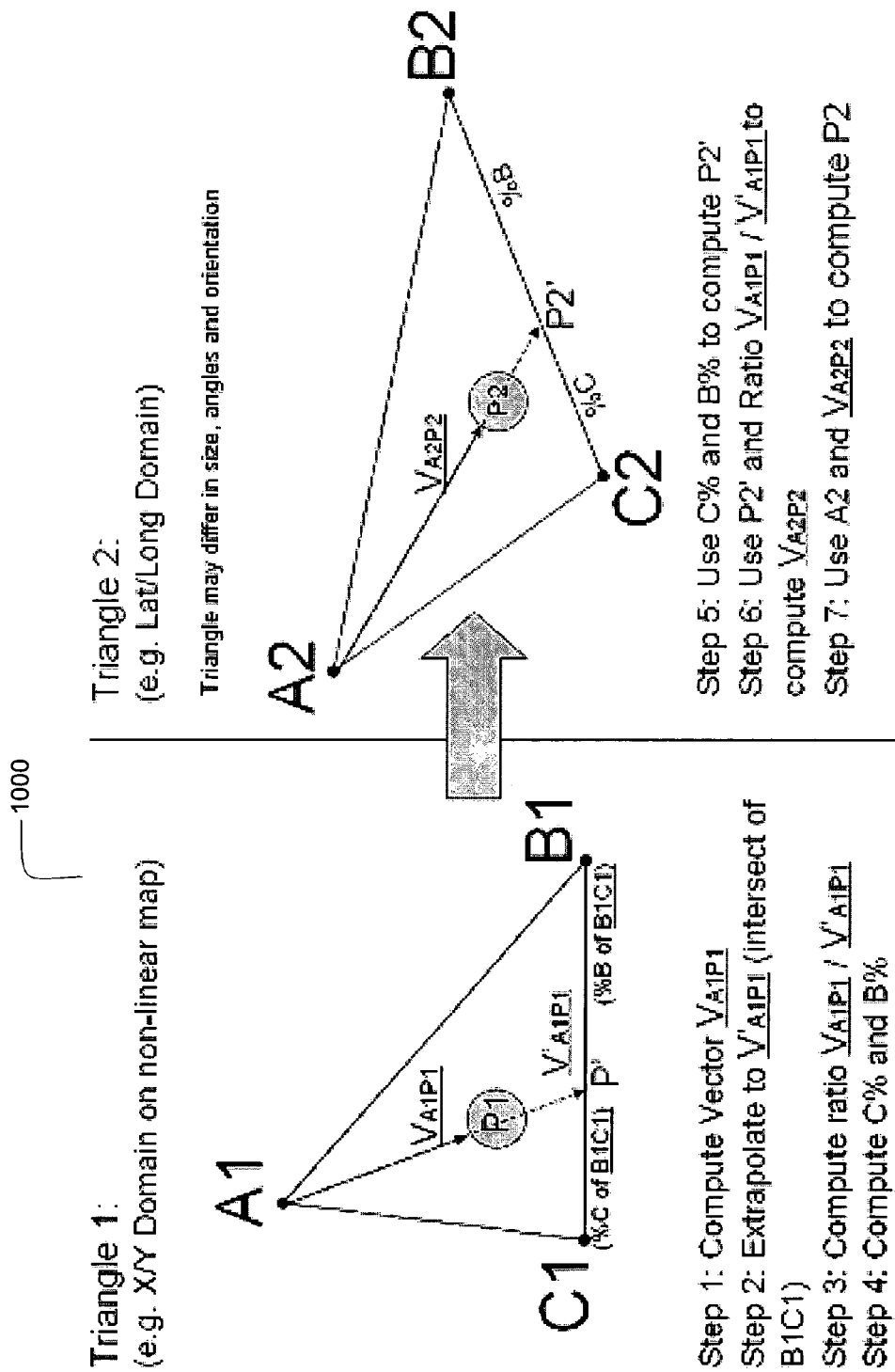
FIG. 10 illustrates in a mathematical diagram (with included steps) how a conversion from a non-linear map to a linear map might occur, and thereby showing how the opposite conversion may occur—by following the illustrated steps in reverse.

Aspects of a Technique for Conversion of (a) Linear to Non-Linear Mapping and (b) Non-Linear to Linear Mapping Next, FIG. 10 displays in a mathematical diagram 1000 a technique for converting linear mapping to non-linear mapping—and vice versa. For example, in FIG. 10, a triangle, "Triangle 1" is drawn in a non-linear mapping domain. This triangle has vertices A1, B1, and C1. These vertices can be the same in the non-linear domain as they are in the linear domain. For instance, A1 can be a subway stop, such as "Warren Street" in FIG. 2; B1 can be another subway stop, such as "Oxford Circus"; and, C1 can be a third subway stop, such as Tottenham Court Road." Each of these subway stops, or in the context of triangles, vertices, can be exactly the same, whether the map is linear or non-linear.

In order to convert "Triangle 1" to "Triangle 2," which persists in a linear domain, with latitude, longitude, and altitude coordinates (as opposed to the X and Y coordinates designated for the non-linear domain), several steps may be taken. If, for example, a point, "P1" is to be mapped from a non-linear map to a linear map, in Triangle 2, a first step may be the drawing of a vector from some vertex of Triangle 1 to P1 in Triangle 1. As FIG. 10 illustrates, vector VA1P1 is drawn from A1 to P1. In the software context, vector VA1P1 is computed from A1 to P1.

Once this vector is computed, in a second step, it is extrapolated to a side opposite of the aforementioned vertex. Thus, another vector is computed: V'A1P1. This vector will then intersect the side of Triangle 1 between vertices C1 and B1. Next, in a third step, a ratio is computed of the two vectors: VA1P1 to V'A1P1. Following this step, in a fourth step, a proportion or percentage is computed of the length of side C1P' to B1P', where P' is the point of intersection of the aforementioned side. This, then, provides enough information to map point P1 into Triangle 2, which, as mentioned, persists in a linear domain.

In order to place P1 in the proper location vis-à-vis points A2, B2, and C2, which define Triangle 2, the following steps may be taken: first, in step 5 (to continue the progression of steps 1-4 considered so far), the proportion of the computed length of sides C1P' to B1P' is used to compute P2', which now stands for the point of intersection between vertices B2 and C2 (this proportion was computed in step 4). Once P2' is computed, the results computed in step 3, can be used in step 6.

In step 6, using the newly computed P2' and the ratio of VA1P1 to V'A1P1, a newly computed vector VA2P2 can be computed. Once this vector is computed, all that is left to do, in step 7, is the computation P2 based on the results obtained from VA2P2 and from the location of A2. After the computation in step 7 is obtained, P2 is found. And this location of P2 in Triangle 2 represents where this point should be vis-à-vis vertices A2, B2, and C2. This process, naturally, can be used to go back to P1 in Triangle 1, based on where P2 is located in Triangle 2. Thus, this process works not only for conversions from non-linear maps to linear maps, but also from linear maps to non-linear maps. Put another way, it is symmetric.

One major benefit of this kind of symmetry is that conversion between linear and non-linear maps can occur an infinite amount of times, without causing any distortion as to the location of points P1 and P2, which, as mentioned in above, was a major shortcoming of any previous mapping techniques.

Figure 11:
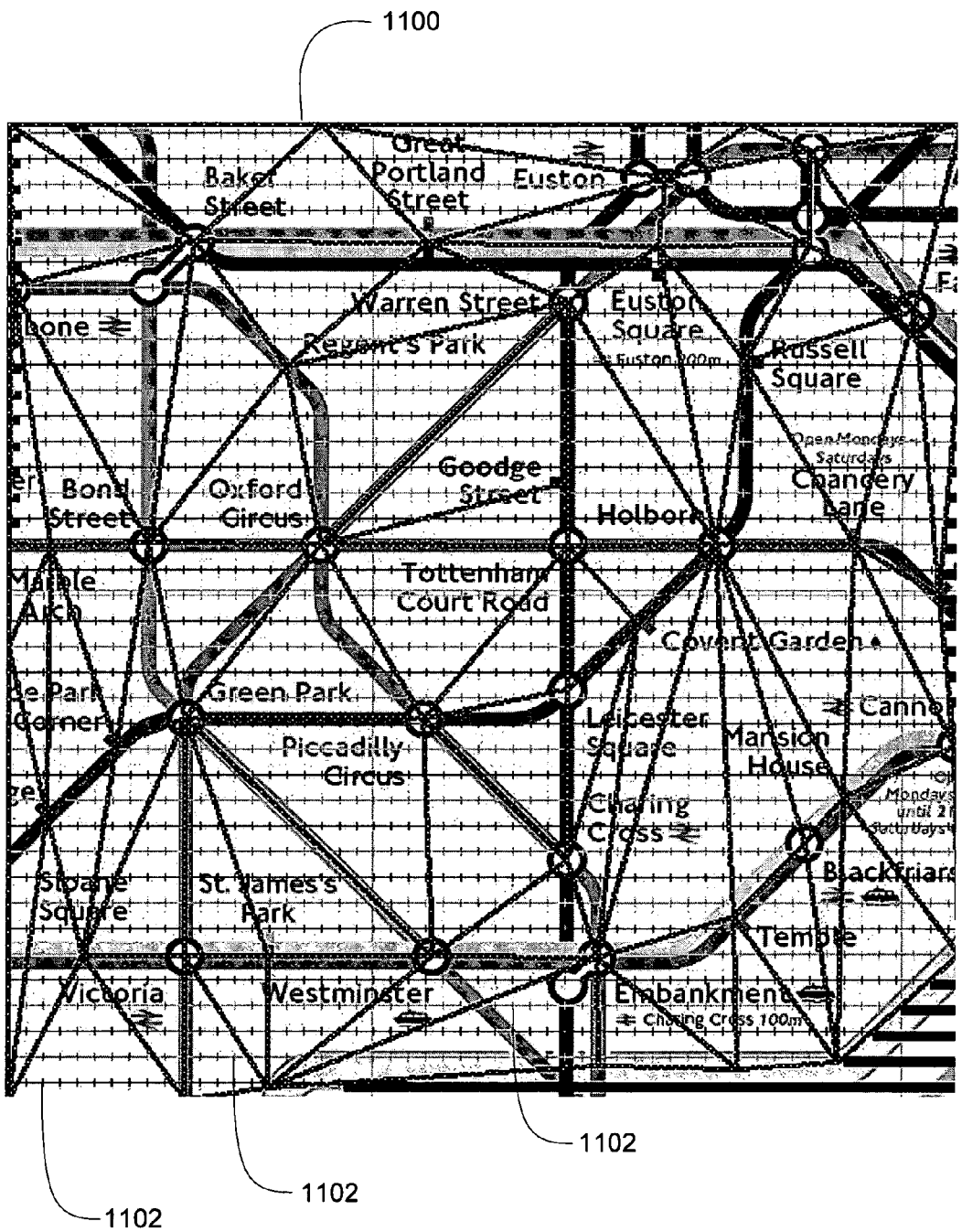
FIG. 11 illustrates how a round trip conversion, from a non-linear map to a linear map and back to a non-linear map—or vice versa—produces no spatial distortion for plotted data, thereby showing the quality of various transformation algorithms that can be visually evaluated.
Figure 12A:
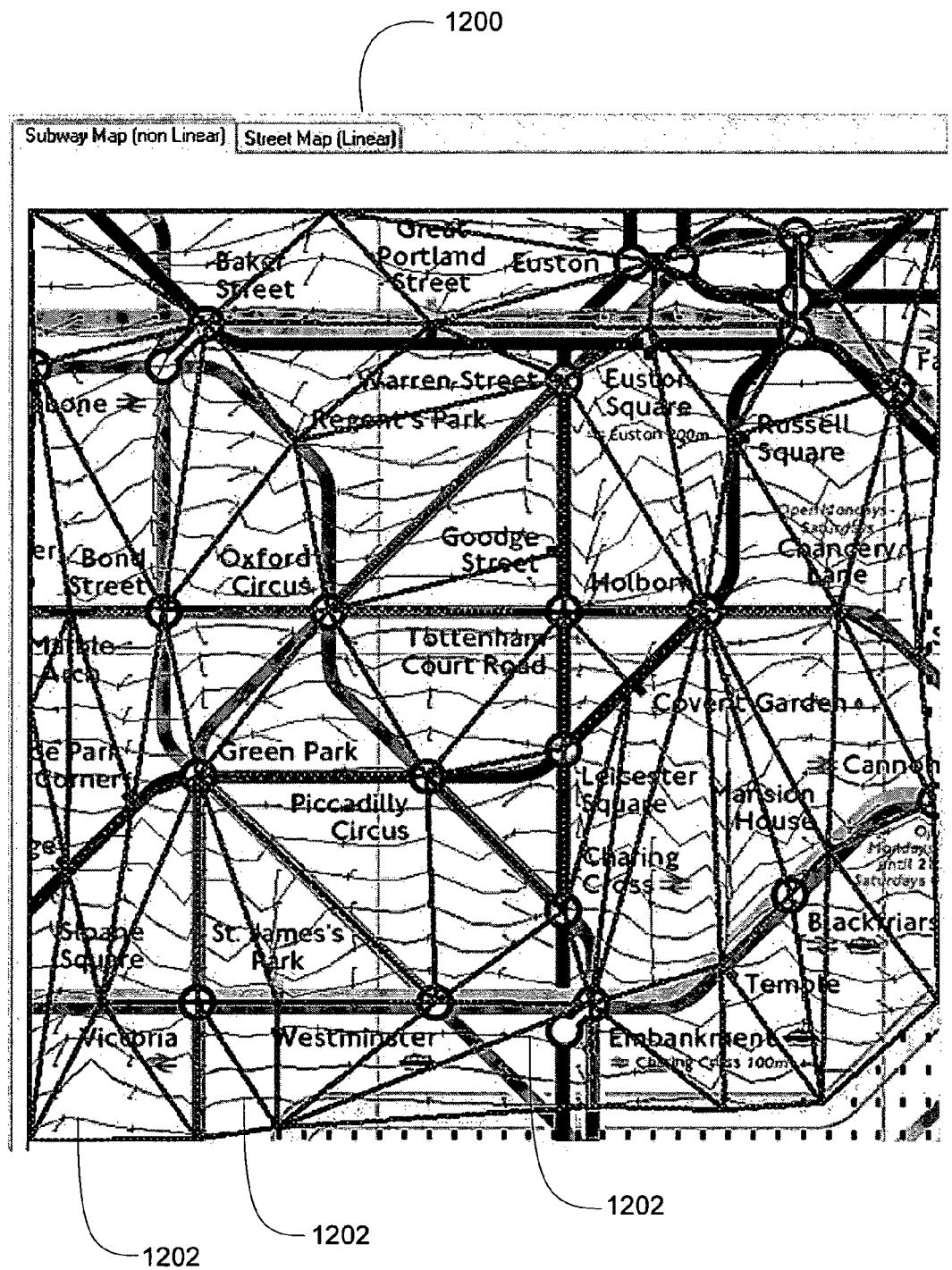
FIG. 12A illustrates, in contrast to FIG. 11, how conversion distortions may occur for algorithms that are inferior to those illustrated in FIG. 10 and used in FIG. 11.
Figure 12B:
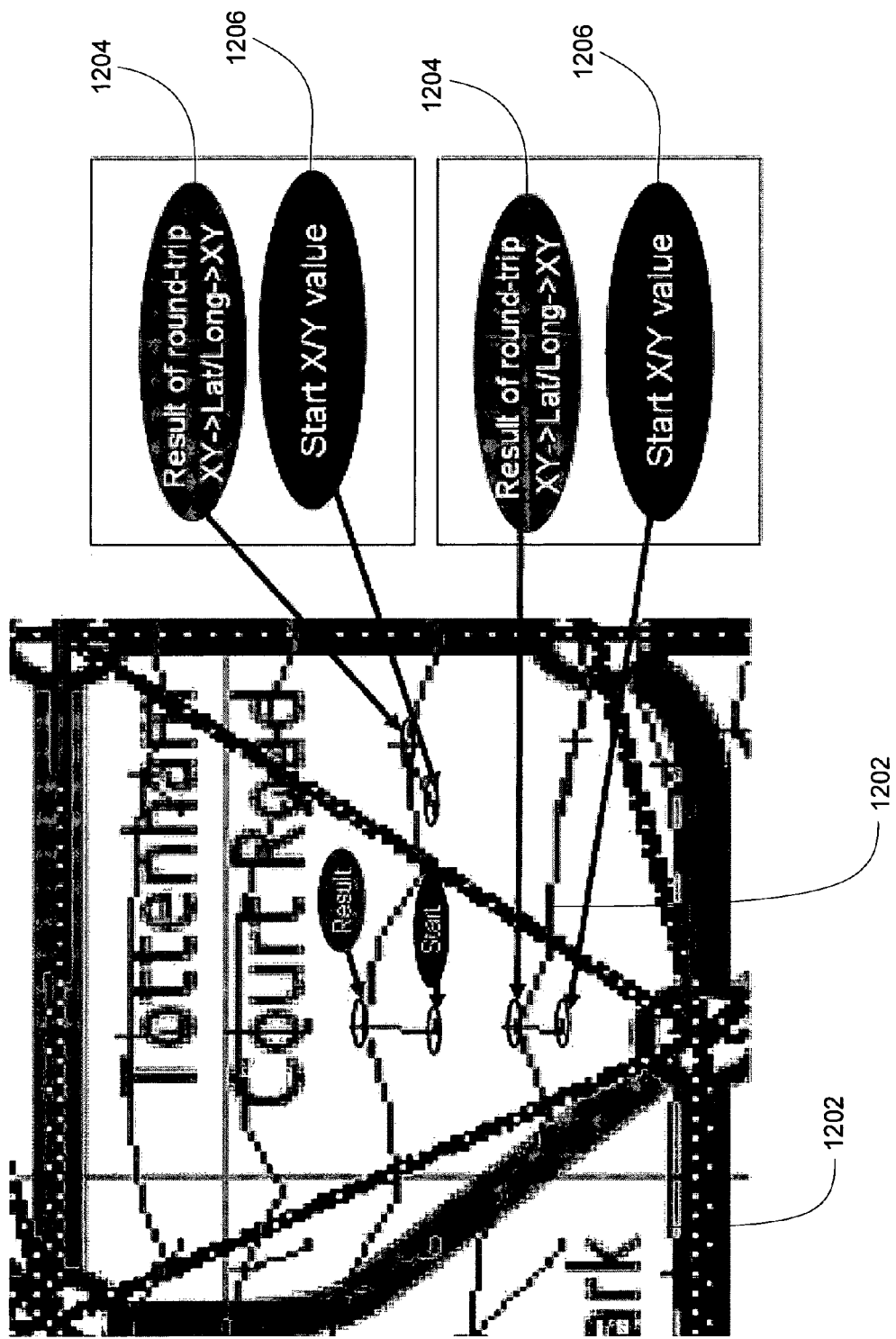
FIG. 12B illustrates in detail the kind of distortions that are shown in FIG. 12A—distortions that the presently disclosed subject matter avoids by using algorithms such as those illustrated in FIG. 10.

FIGS. 11 and 12A and 12B illustrate this point. First, FIG. 11 shows how a round trip conversion—in this case from a non-linear map to a linear map and back to a non-linear map—produces no spatial distortion for plotted data, thereby showing the quality of various transformation algorithms that can be visually evaluated. Specifically, a symmetric transformation, such as the one discussed with reference to FIG. 10, produces 0 round-trip error (in contrast to FIGS. 12A and 12B). In this non-linear map 1100, X and Y coordinates on the non-linear map are transformed to latitude and longitude coordinates, and then back to X and Y coordinates. Since the algorithm used in FIG. 11 is symmetric, the original X and Y values are returned. Hence, the graphed lines 1102 are simply horizontal lines—as opposed to the wavy lines in FIG. 11, which are generated using a non-symmetric technique. In this way, the quality of various transformation algorithms can visually be evaluated.

Thus, in contrast to FIG. 11, FIG. 12A illustrates a non-linear map 1200 where the horizontal lines 1202 are wavy because the round-trip conversion produces an error, due to the non-symmetric nature of the conversion algorithm. FIG. 12B, in fact, represents a zoomed-in version of FIG. 12A, and shows in great detail the kind of round-trip error that is produced. Thus, again, the horizontal lines 1202 are wavy. When the first leg of the round-trip conversion starts 1206, there is some X and Y value for a particular point on the non-linear map 1200. Upon the result 1204 of the round-trip conversion, it can be clearly seen that the "Start" point is in a different place than the "Result" point. In other words, the X and Y coordinates at the "Start" are different from the X and Y coordinates at the "Result," and this is an error—since the X and Y coordinates should be the same at the "Start" and at the "Result." As mentioned, the conversion technique discussed with reference to FIG. 10 avoids creating this error.

Figure 13:
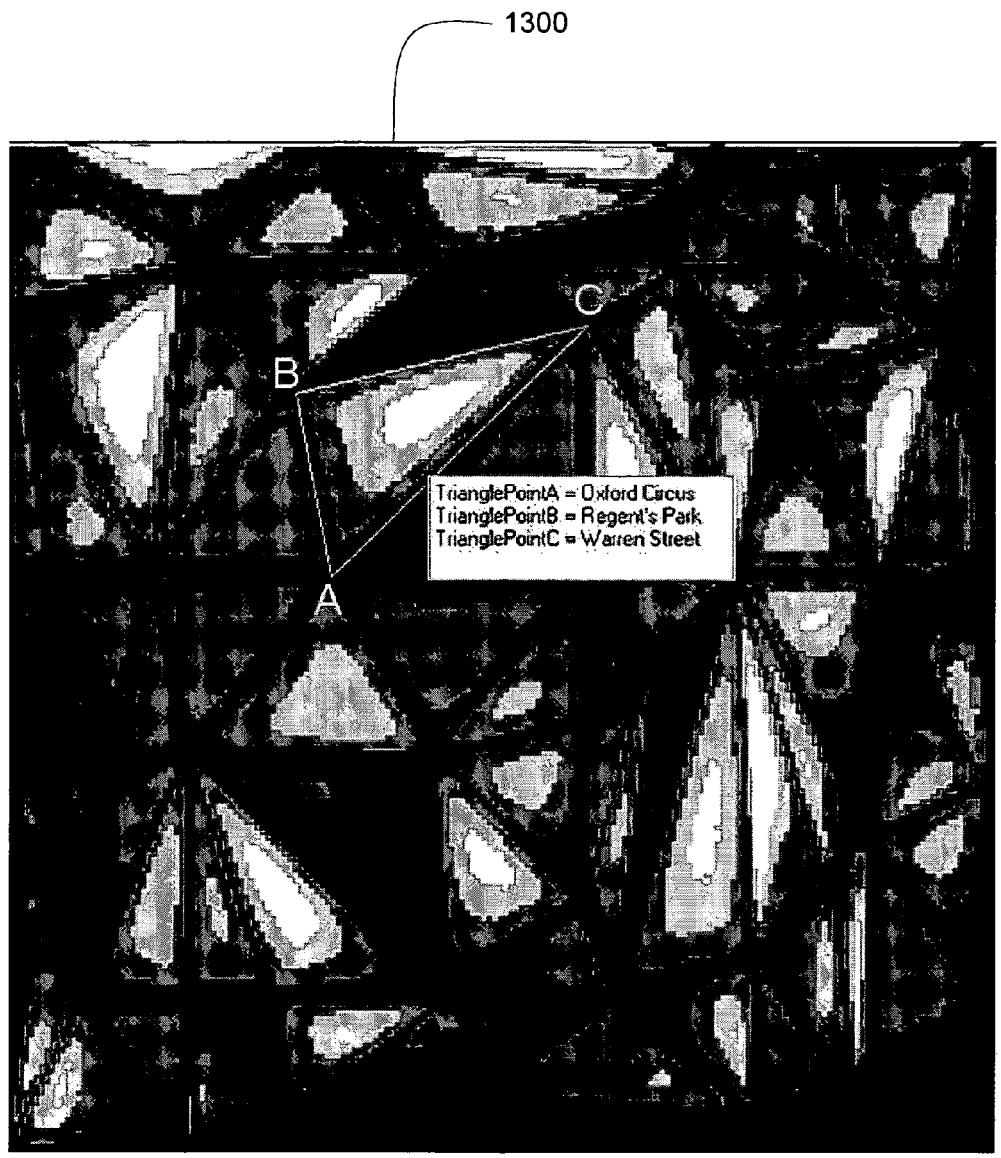
FIG. 13 illustrates yet another way to depict conversion distortions, such as those illustrated in FIGS. 12A and 12B.

FIG. 13 provides another useful illustration showing an error-distortion map. This map allows a user to visually examine the transformation error present in all of the triangles they have defined, in order to then take corrective action. In the image 1300, lighter areas indicate areas of greater error distortion. Black areas indicate areas of zero error, which corresponds to the lines of the defined triangles.

A triangle ABC is defined in the image 1300, with vertex A corresponding to "Oxford Circus" (as shown in FIG. 7A), vertex B corresponding to "Regent's Park," and vertex C corresponding to "Warren Street." As can be seen, around the edges of triangle ABC, the error is zero because the edges are black; however, in the middle of triangle ABC, the error is greatest, given the white shading. These errors appear because the conversion technique depicted in the image 1300 is non-symmetrical. If a symmetrical technique were to be used, such as the one discussed with reference to FIG. 10, the entire image 1300 would appear black—since no errors would be produced.

Figure 14:
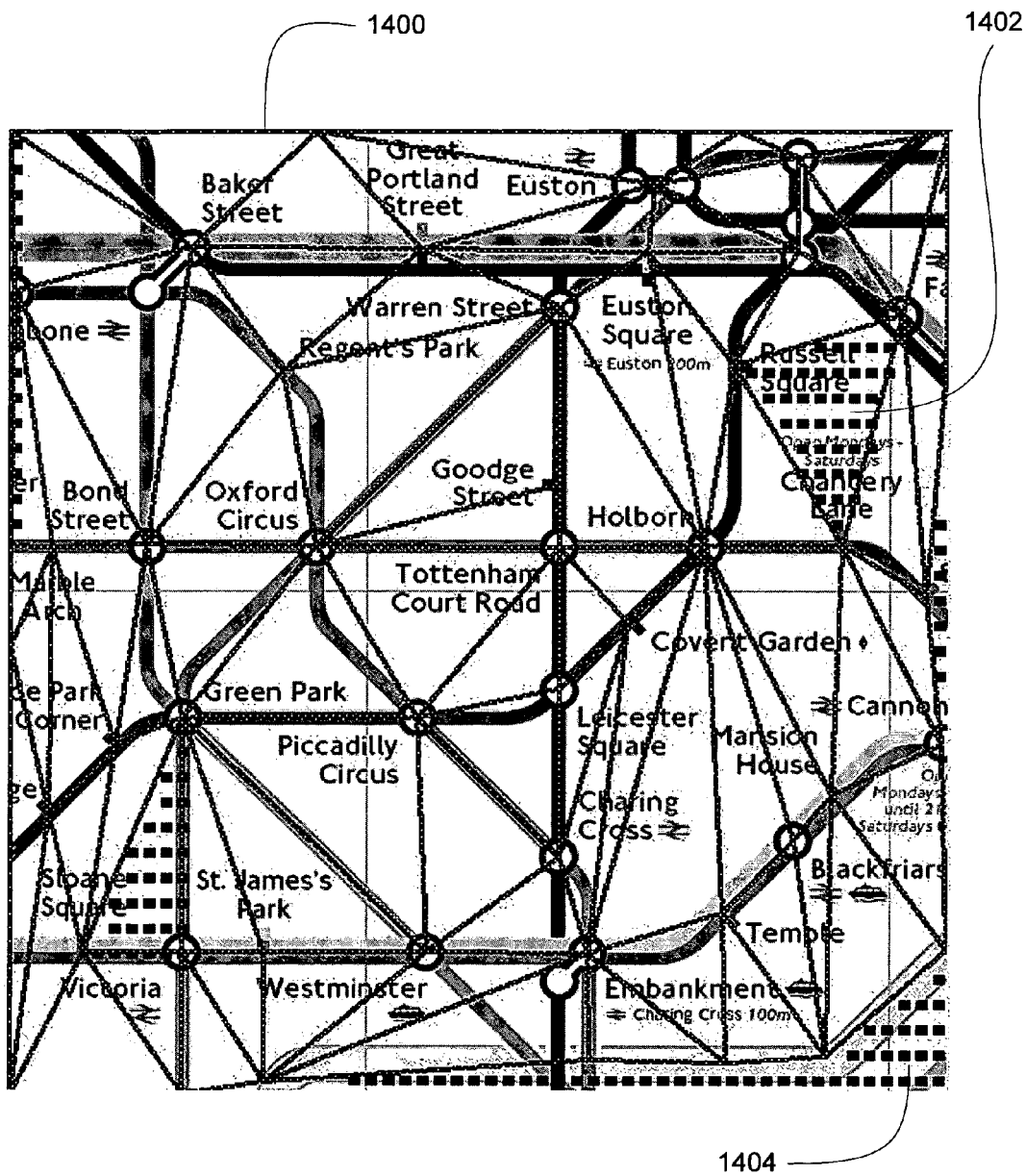
FIG. 14 illustrates the notion that some areas don't have to be (or have not been marked as) supporting conversion from a linear map to a non-linear map—or vice versa—by showing specific regions that are highlighted as not-supporting coordinate conversion.

Next, FIG. 14 illustrates the notion that some areas don't have to be (or haven't been) converted from a linear map to a non-linear map—or vice versa—by showing specific regions that are highlighted as non-converted. For example, the map 1400 in FIG. 14 gives a developer or map-designer visual feedback indicating which regions have not yet have triangles defined for them (and hence do not support X/Y to latitude, longitude, and altitude transformations). These yet to be defined areas are highlighted below using blue rectangles. Some of them may be areas that the developer or map-designer has forgotten 1402 to specify triangles for (e.g. middle/upper right, Russell Square), and some (lower right) specify areas that the developer or map-developer has decided will not be supported 1404 on this map.

Aspects of Exemplary Classes

Various classes can be used to implement the above-discussed aspects of the presently disclosed subject matter. For example, a "NonLinearMapInfo" class can be used to perform the following functionalities: (1) Use the coarse grained bounding areas described above to determine whether the non-liner map it represents is appropriate for the map-locations that need to be displayed; and (2) when appropriate, loads the "NonLinearMapView" class and points it to the dual-triangle data and the map image.

The "NonLinearMapView" class, in turn, may provide the following functionalities: (1) contain a "LocationTriangleManager" class that manages all the triangles in the map; (2) contain the non-linear map image (or the capability of rendering one as needed). The above referred to class of "LocationTriangleManager" may perform the following functionalities: (1) maintain a (sorted) list of LocationTriangles for use in X/Y to Lat/Long/Alt coordinates; (2) select the correct LocationTriangle for a given X/Y or Lat/Long point; (3) provide the capability of performing X/Y->Lat/Long and Lat/Long->X/Y transformations; (4) provide the capability of computing the error-distortion in any given triangle (or any given point), where both average and maximum distortion are computed; (5) provide the capability of splitting triangles into sub-triangles using a variety of different heuristics; (6) provide the capability of loading and saving sets of "LocationTriangle" data.

Such data may be associated with a "LocationTriangle" class that: (1) holds data for two triangles: (1) a triangle on the surface of the X/Y image of the non-linear map, and a triangle in physical (real world) space, i.e. latitude, longitude, and altitude; (2) provides the capability of quickly determining if a point is contained in the either triangle; (3) provides the capability of translating points inside it between the non-linear map X/Y and real-world coordinate systems. Of course, this class and the three other classes discussed herein are merely exemplary, and not limiting.

Implementation Aspects of Linear and Non-Linear Mapping

Figure 15A:
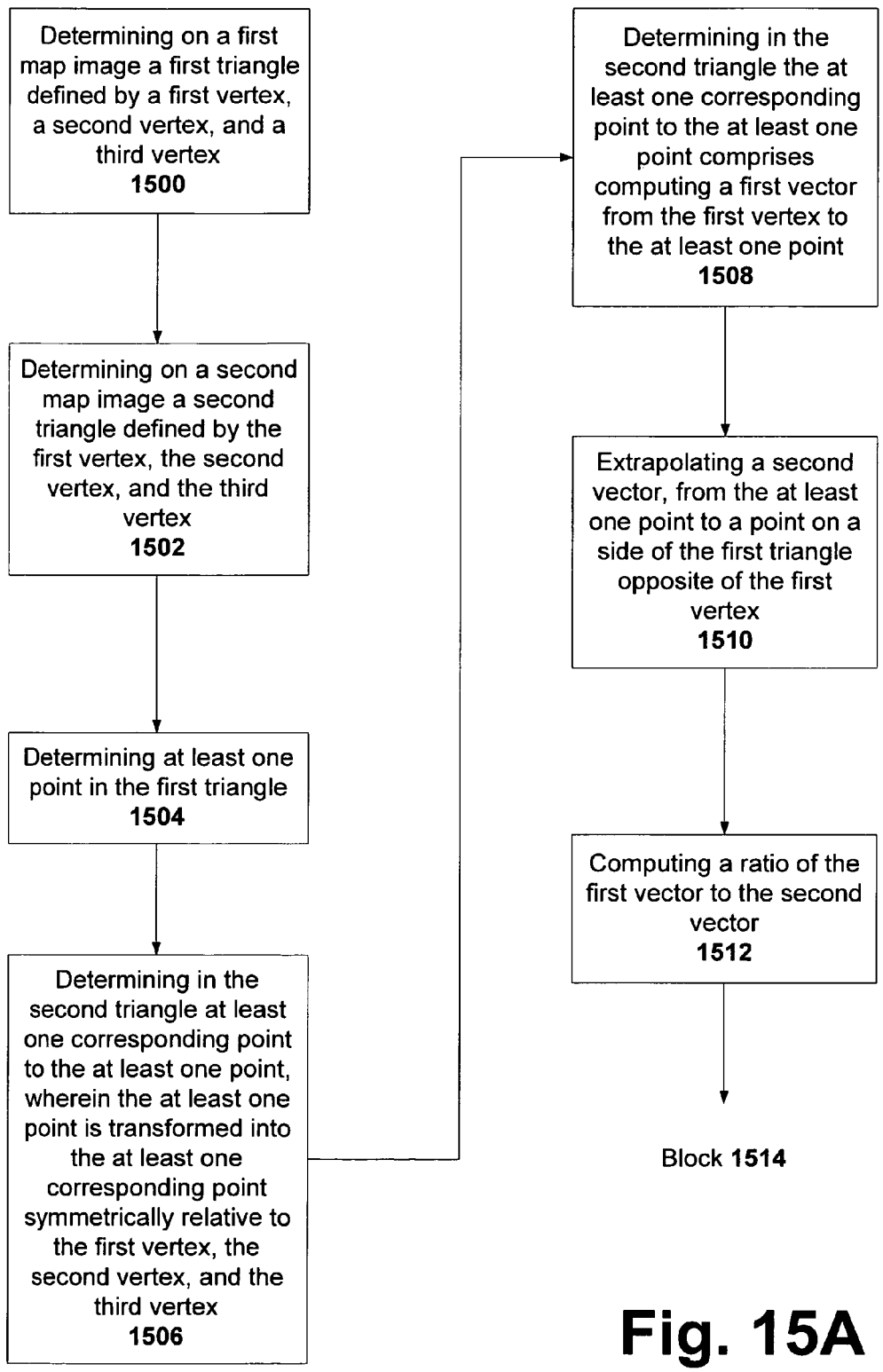
FIG. 15A illustrates an exemplary block diagram of a conversion process either from linear maps to non-linear maps, or vice versa.
Figure 15B:
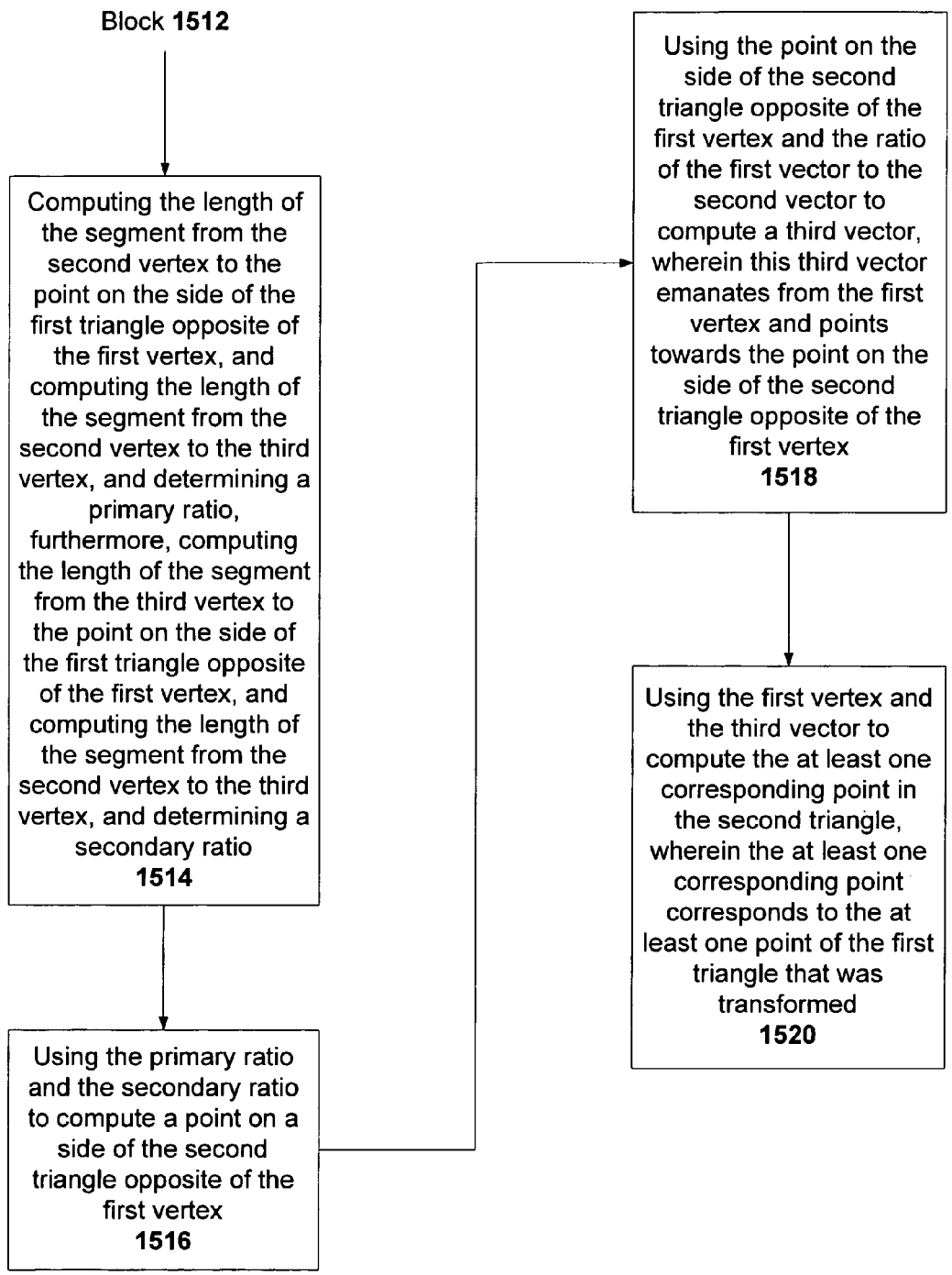
FIG. 15B continues the illustration of FIG. 15A, illustrating an exemplary block diagram of a conversion process either from linear maps to non-linear maps, or vice versa.

In one exemplary implementation, in FIGS. 15A and 15B, consistent with the subject matter discussed with reference to FIG. 10, a block diagram illustrates one way of designing and using arbitrary maps, whether such maps are linear or non-linear. The blocks 1500 to 1520 are self-explanatory, especially in light of FIG. 10. They present a general implementation that could be used in any system, such as a computing system, or more specifically, a software mapping system.

With this system, moderately skilled programmers and other non-experts, for example, working with map images can apply and/or use them in the following manner: (1) import existing non-linear and irregularly spaced map images into the system; (2) quickly annotate the non-linear map's images with real-world physical location data (using, for instance, a combination of other maps to help guide their mapping process); (3) design a set of triangle shapes on map surfaces that connect known points and define boundary conditions inside which translations between real-world coordinates and points on the non-linear map can take place; (4) project these triangles and location points onto a variety of maps to audit the area covered by the non-linear map and its user annotations; (5) audit the non-linear map annotations to determine areas of unacceptable error distortions that need to be corrected; (6) guide and aid developers or map designers in correcting and minimizing these distortions; (7) allowing developers or map designers to view the areas covered by the defined triangles on a physical world map, and to choose coarse bounding regions that define the physical world areas well covered by the non-linear map (alternatively, default bounding regions can be automatically chosen to assist the user in this process); (8) use these maps at run-time in arbitrary software applications that utilize the maps, simultaneously conveying to users map data on both linear (e.g. street maps) and non-linear surfaces (e.g. subway maps); and (9) construct these maps at design time (in contrast to run-time).

Thus, per the discussion above, in one aspect of the presently disclosed subject matter, any useful non-linear or irregularly shaped map image can be broken down into a series of dual-triangles. Each dual-triangle specifies an X and Y area on the non-linear map, and a parallel real-world area having latitude and longitude coordinates (hence the name "dual-triangle"). Transformations or conversions with controllable error magnitudes can be done between linear and non-linear maps in both directions. A rich design surface, capable of showing the map data in several different projections may be useful in doing this.

In this aspect, then, an arbitrary number of sub triangles can be defined to lower translation or conversion error as may be needed. Many heuristics are possible for automating this triangle refinement process. Moreover, the specification of coarse bounding areas for maps may allow for quick determination whether any individual map is suitable to display a set of map coordinate information.

This system of dual-triangles and related points can be persisted in a text or binary file for use at run-time. For flexibility purposes, a text representation such as XML may be useful. Alternatively, for compactness and performance purposes, a binary representation may be useful. At both design-time and run-time, specified classes can be used to efficiently manage the use of all these dual-triangles for coordinate mapping. Thus, it is possible to a manager module to be optimized to allow for efficient access to commonly used triangles.

Put in other words, this system provides a mechanism for non-experts to quickly and with predictable accuracy to annotate arbitrary non-linear and irregularly spaced maps, allowing for the projection of location based data onto these maps in software applications. This is useful for all kinds of software applications, and particularly useful for mobile devices used by individuals in real-world environments in need of these maps.

Figure 16:
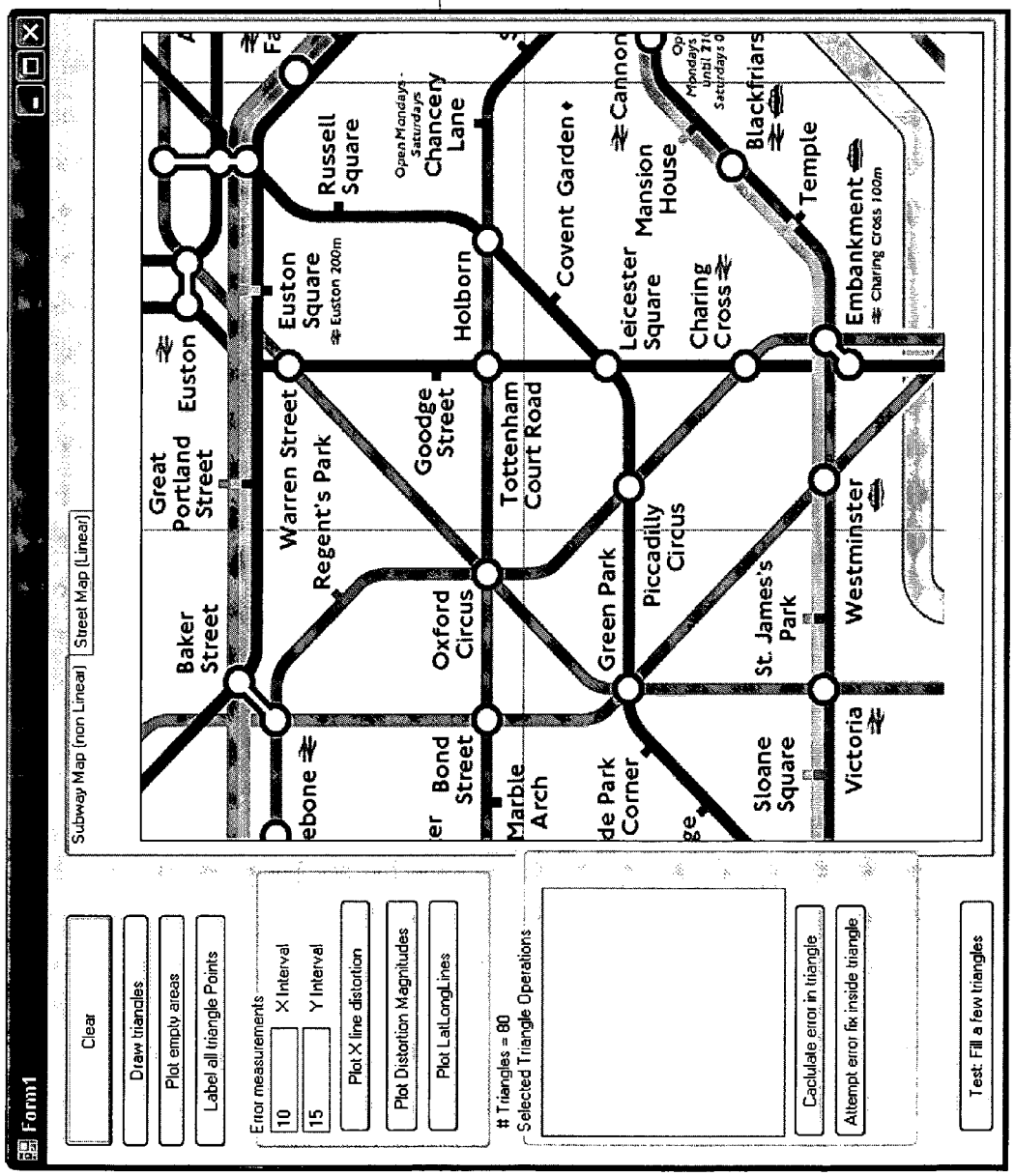
FIG. 16 illustrates an exemplary application programming interface for various aspect of the presently disclosed subject matter.

To this end, a map design surface 1600, such as the one illustrated in FIG. 16, supported by an application programming interface (API) can be used to allow developers to easily work with a wide variety of linear and non-linear maps. Non-expert developers (or other designers) can be given any easy programming and graphical interface—not limited to the one illustrated in FIG. 16—to define these dual-triangle systems and to use them to project location data onto map image(s). FIG. 16 illustrates that users or developers can "Draw triangles," "Plot empty areas," "Label all triangle Points," "Calculate error[s] in triangle[s]," and so on. These options are merely exemplary, and other aspects discussed herein can easily be incorporated into such design surfaces 1600, as those of skill in the art will readily appreciate.

Notably, an important question when dealing with sets of maps (some linear, some irregular) is which is the best map to display to meet users' needs. Several maps may be applicable given some set of data. It may be important for an application to be able to choose the maps that can show the data most accurately and efficiently. Unlike linearly spaced maps, the region of effective display may not be defined by a simple rectangle or circle. For this, a high performance and flexible mechanism may be provided for designating the real-world regions for which a given irregularly or non-linearly spaced map is best suited for. The presently disclosed subject matter may provide both a design-time and run-time mechanisms for this.

Thus, in another aspect, a display surface may be provided that allows a non-expert developer or map designer to visually see, understand, and modify the sets of triangles that will govern the X/Y to latitude and longitude transformations or conversions for a given map. This design surface may allow for simultaneous display of the sets of mapping triangles on both the non-linear map and the other map representations, such as linear street maps. The result may be flexible and useful in allowing for the rapid use of non-linear maps in software applications by the mapping framework described herein.

Furthermore, a system may be provided for the detection of error distortions and overlapping mapping triangles. Since a triangle set describes a bounded transformation or conversion between X/Y and latitude/longitude spaces, with its own internal distortions, having two sets of significantly overlapping triangles would potentially introduce conflicting X/Y to latitude/longitude mappings. It may be important to be able to detect this situation at design time when the triangles defining map transformations are being designated. Further, when an unacceptable magnitude of error exists in a transformation, this error should be detectable and fixable at design time by non-experts (the actual rate of acceptable error will vary from application to application). This system, then, may provide this detection. The developer or map designer may also be shown a visual representation of the distortions that exist inside map-triangles between X/Y to latitude/longitude transformations and latitude/longitude to X/Y mappings, thus allowing for the developer or map designer to take corrective action. Such corrective action may comprise of defining additional, more fine-grained mapping triangles, as may be required).

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, a visual identity mechanism was disclosed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system for distortionless conversion between a first space and a second space, comprising:
   a processor, wherein the processor is adapted to:
   (a) receive the first space and the second space, wherein the first space and second space each respectively comprises one of a linear and non-linear mapping of a plurality of points in a coordinate system;
   (b) determine a mapping from points in the first space to points in the second space by:
   (c) determining at least one first triangular region of the first mapping, wherein each first triangular region is defined by a first set of three vertices (A1, B1, C1);
   (d) determining each of a plurality of corresponding second triangular regions in the second mapping corresponding respectively to each of the first triangular regions of the first mapping, wherein each triangular region in the second mapping is defined by a second set of three vertices (A2, B2, C2), wherein each of the second set of three vertices respectively corresponds identically in location to the first set of three vertices (A1, B1, C1);
   (e) for each first triangular region, determining a first point (P1) associated with the region;
   (f) determining a first vector associated with the first point (VA1P1), wherein the first vector is defined by the first point (P1) and a vertex (A1) of the associated triangular region;
   (g) determining a second vector (V'A1P1) from the first point to a side of the triangular region opposite the vertex, the second vector intersecting the side of the triangular region at a second point (P') so as to subdivide the side into a first segment (B1P') and a second segment (C1P');
   (h) determining a first ratio of a length of the first vector (VA1P1) to a length of the second vector (V'A1P1);
   (i) determining a second ratio of a length of the first segment (B1P') to a length of the second segment (C1P');
   (j) determining a third point (P2') on a side of the second triangular region opposing the vertex (A2) using the second ratio;
   (k) determining a third vector (VA2P2) in the second triangular region using the first ratio, wherein the third vector is defined by the vertex (A2) and the third point (P2'); and
   (l) determining a fourth point in the second triangular region (P2) using the point (P2') and the third vector corresponding respectively to the first point in the first triangular region.

2. The system according to claim 1, wherein the first mapping is an image.

3. The system according to claim 1, wherein the second mapping is an image.

4. The system according to claim 1, wherein the first space is subdivided into a conversion region, wherein only the conversion region is mapped to the second space.

5. The system according to claim 4, wherein a region on the first space is configured to be designated as avoiding conversion from the first space to the second space.

6. The system according to claim 1, wherein the at least one first triangular region is further subdivided into a plurality of sub-triangular regions.

7. The system according to claim 1, wherein the first space and second space represent geographic information respectively mapped by a linear and non-linear mapping from latitude and longitude information.

8. A method for designing and using arbitrary maps, comprising:
- determining by a computer processor on a first map image a first triangle defined by a first vertex, a second vertex, and a third vertex;
- determining by a computer processor on a second map image a second triangle defined by the first vertex, the second vertex, and the third vertex;
- displaying by a computer processor on a display surface simultaneously the first and second triangle;
- determining by a computer processor at least one point in the first triangle; and
- determining by a computer processor in the second triangle at least one corresponding point to the at least one point, wherein the at least one point is transformed into the at least one corresponding point symmetrically relative to the first vertex, the second vertex, and the third vertex, wherein the corresponding point is determined by:
  - computing a first ratio of a length of a first vector from the first vertex of the first triangle to the point and a length of a second vector from the point to a side of the triangle opposite the first vertex of the first triangle, the first and second vertexes being in alignment;
  - computing a second ratio of a length of a first portion of the opposite side to a second portion of the opposite side, the first and second portions determined by a bisecting of the opposite side by the second vector;
  - determining a point on a side of the second triangle opposing the first vertex of the second triangle using the second ratio;
  - determining a third vector in the second triangle using the first ratio, wherein the third vector is defined by the first vertex of the second triangle and the point on the side of the second triangle; and
  - determining a position of the corresponding point in the second triangle using the point on the side of the second triangle and the third vector in the second triangle.

9. The method according to claim 8, further comprising selecting a region on the first map image to be transformed into a corresponding region on the second map image.

10. The method according to claim 9, wherein the selecting of the region on the first map image includes the selecting of the first triangle.

11. The method according to claim 8, wherein the first and second map images are respectively one of a street map and a subway map.

12. The method according to claim 11, wherein the map images are a set of points mapped into respective spaces from latitude and longitude data.

13. The method according to claim 11, further comprising displaying error distortion information based upon the first and second triangles.

14. The method according to claim 13, further comprising receiving input regarding further subdividing the first and second triangles into respective first and second sub-triangles based upon the distortion information.

15. The method according to claim 14, wherein information regarding the first and second triangles and first and second sub-triangles are stored an XML file for use at runtime.

16. The method according to claim 8, wherein the first and second map images represent telecommunication grids.

17. The method according to claim 8, wherein the first and second map images represent transportation maps.

18. A computer readable medium bearing tangible executable instructions for designing and using arbitrary maps, comprising instructions for:
- receiving a definition of a plurality of dual-triangles corresponding to a first map image and to a second map image, wherein the plurality of dual-triangles comprises first and second triangles in the first and second map images, respectively, wherein the first and second triangles each having a corresponding first vertex, second vertex, and third vertex, wherein the plurality of dual-triangles allow for symmetric transformation of data between the first map image and the second map image for selected regions on one of the first map image and the second map image, wherein at least one point and at least one corresponding point in the dual triangles is determined, and the at least one corresponding point is determined by:
  - computing a first ratio of a length of a first vector from the first vertex of the first triangle to the point and a length of a second vector from the point to a side of the triangle opposite the first vertex of the first triangle, the first and second vertexes being in alignment;
  - computing a second ratio of a length of a first portion of the opposite side to a second portion of the opposite side, the first and second portions determined by a bisecting of the opposite side by the second vector;
  - determining a point on a side of the second triangle opposing the first vertex of the second triangle using the second ratio;
  - determining a third vector in the second triangle using the first ratio, wherein the third vector is defined by the first vertex of the second triangle and the point on the side of the second triangle;
  - determining a position of the corresponding point in the second triangle using the point on the side of the second triangle and the third vector in the second triangle; and
  - displaying error distortion information based upon the first and second triangles.

19. The computer readable medium according to claim 18, wherein the plurality of dual-triangles are defined at design-time.

20. The computer readable medium according to claim 18, wherein the plurality of dual-triangles are defined at run-time.

* * * * *